United States Patent
Hicken et al.

(10) Patent No.: US 6,473,896 B1
(45) Date of Patent: Oct. 29, 2002

(54) METHOD AND SYSTEM FOR GRAPHICALLY GENERATING USER-DEFINED RULES FOR CHECKING LANGUAGE QUALITY

(75) Inventors: Wendell T. Hicken, La Verne, CA (US); Adam K. Kolawa, Bradbury, CA (US)

(73) Assignee: Parasoft, Corp., Monrovia, CA (US)

( * ) Notice: Subject to any disclaimer, the term of this patent is extended or adjusted under 35 U.S.C. 154(b) by 0 days.

(21) Appl. No.: 09/413,612

(22) Filed: Oct. 6, 1999

Related U.S. Application Data

(60) Provisional application No. 60/104,072, filed on Oct. 13, 1998.

(51) Int. Cl.[7] .................................................. G06F 9/45
(52) U.S. Cl. ........................................ 717/132; 717/125
(58) Field of Search ............................ 717/1, 2, 132, 717/125; 345/700–866, 967

(56) References Cited

U.S. PATENT DOCUMENTS

| | | | | |
|---|---|---|---|---|
| 4,949,253 A | * | 8/1990 | Chigira et al. ............... | 717/107 |
| 5,097,411 A | * | 3/1992 | Doyle et al. ................. | 345/522 |
| 5,187,788 A | * | 2/1993 | Marmelstein ................ | 717/109 |
| 5,251,322 A | * | 10/1993 | Doyle et al. ................. | 345/501 |
| 5,285,386 A | * | 2/1994 | Kuo ............................... | 704/2 |
| 5,293,629 A | * | 3/1994 | Conley et al. ................. | 717/8 |
| 5,390,325 A | * | 2/1995 | Miller .......................... | 714/38 |
| 5,408,410 A | * | 4/1995 | Kaji .............................. | 704/2 |
| 5,490,249 A | * | 2/1996 | Miller .......................... | 714/38 |
| 5,583,948 A | * | 12/1996 | Crank et al. .................. | 714/48 |
| 5,630,127 A | * | 5/1997 | Moore et al. ................. | 707/104 |
| 5,649,200 A | * | 7/1997 | Leblang et al. .............. | 707/203 |
| 5,652,835 A | * | 7/1997 | Miller .......................... | 714/38 |
| 5,652,882 A | * | 7/1997 | Doktor ........................ | 707/201 |
| 5,710,894 A | * | 1/1998 | Maulsby et al. ............. | 345/763 |
| 5,790,116 A | * | 8/1998 | Malone et al. ............... | 345/335 |
| 5,828,376 A | | 10/1998 | Solimene et al. ........... | 345/352 |
| 5,844,560 A | | 12/1998 | Crutcher et al. ............. | 345/354 |
| 5,860,011 A | * | 1/1999 | Kolawa et al. ................ | 717/8 |
| 5,874,952 A | | 2/1999 | Morgan ....................... | 345/328 |
| 5,894,305 A | | 4/1999 | Needham ..................... | 345/329 |
| 5,900,870 A | * | 5/1999 | Malone et al. .............. | 345/333 |
| 5,923,325 A | | 7/1999 | Barber et al. ................ | 345/336 |
| 6,222,559 B1 | * | 4/2001 | Asano et al. ................ | 345/440 |

OTHER PUBLICATIONS

Frenkel, Toward Automating the Software Development Cycle, Jun. 1985, ACM, p. 578–589.*

S. Meyers, "Effective C++ 50 Specific Ways to Improve Your Programs and Designs", 1992, pp. xiv–xvi, Addison Wesley Longman, Inc.

E. Bailey, "C++ SoftBench CodeAdvisor 5.0 Helps You Work Faster, Smarter and Improve Code Reliability", Soft Bench Insights, Dec. 1995, pp. 5–6.

* cited by examiner

*Primary Examiner*—Tuan Q. Dam
*Assistant Examiner*—John Q. Chavis
(74) *Attorney, Agent, or Firm*—Christie, Parker & Hale, LLP

(57) ABSTRACT

A method and system for graphically generating user-defined rules to be used for checking the quality of a language. A Graphical User Interface (GUI) with a plurality of menus provides easy and effective means for generating user-defined rules. Generally, each rule comprises a node type associated with a matching function. Nodes and their properties are graphically generated and connected to construct rules. In one embodiment, the present invention graphically generates user-defined rules to be used for checking the quality of a computer programming language. Each instruction in a computer programming language is represented by at least one node of a particular type stored in a parse tree for describing dependencies between such nodes. Both the parse tree and the rules are stored in the computer. The parse tree is searched beginning from a root node indicating an entry point into the parse tree for at least one of the nodes having such a particular type matching one of the node types.

21 Claims, 25 Drawing Sheets

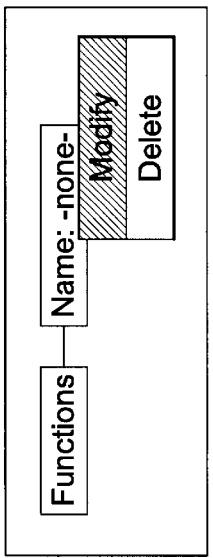
FIG. 15E
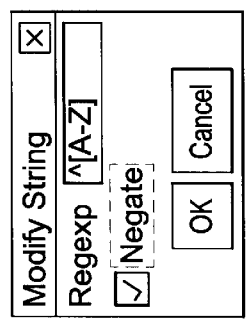
FIG. 15G
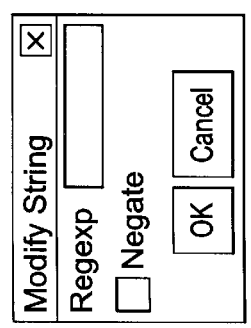
FIG. 15D
FIG. 15F
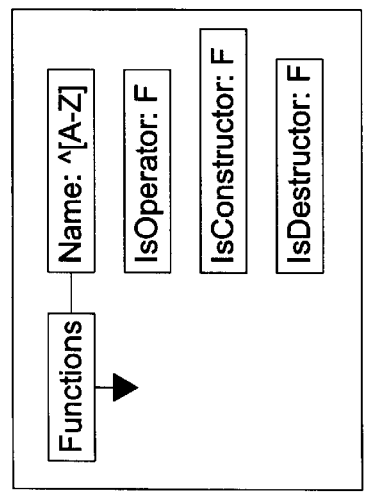
FIG. 15H FIG. 16A
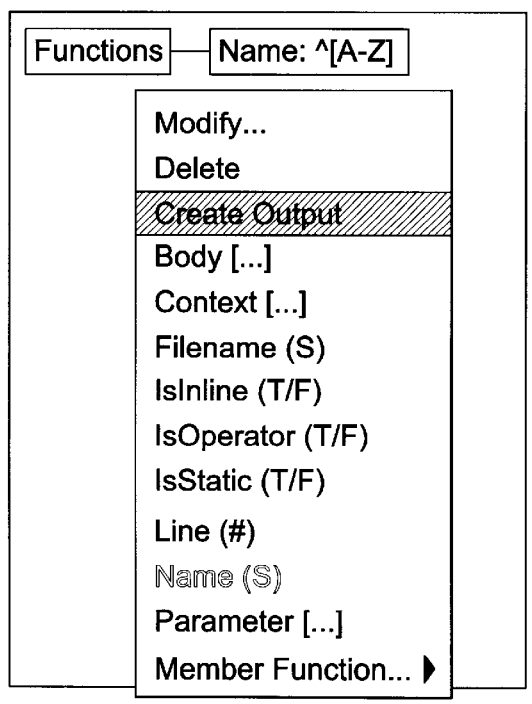
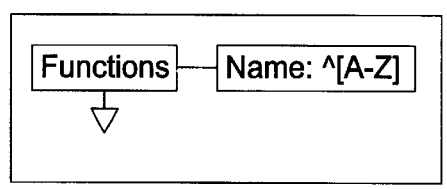
FIG. 16B
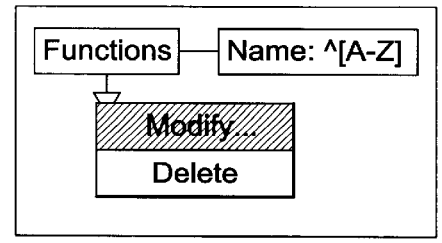
FIG. 16C
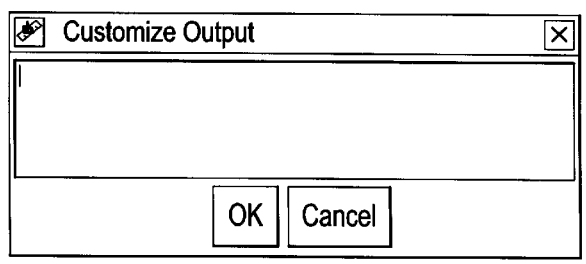
FIG. 16D
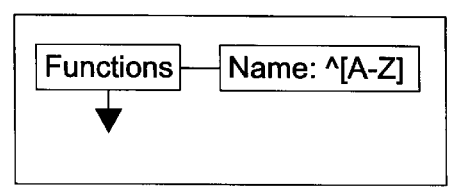
FIG. 16E // METHOD AND SYSTEM FOR GRAPHICALLY GENERATING USER-DEFINED RULES FOR CHECKING LANGUAGE QUALITY

CROSS-REFERENCE TO RELATED APPLICATION

This patent application claims the benefit of the filing date of U.S. Provisional Patent Application Ser. No. 60/104,072, filed Oct. 13, 1998 and entitled "METHOD AND SYSTEM FOR GRAPHICALLY GENERATING USER-DEFINED RULES FOR CHECKING COMPUTER PROGRAMMING LANGUAGE QUALITY", the entire contents of which are hereby expressly incorporated by reference.

FIELD OF THE INVENTION

The present invention relates to a method and system for graphically generating user-defined rules to be used for searching and checking a defined relationship between a set of given information. More specifically, the present invention is directed to a method and system for graphically generating user-defined rules to be used for checking the quality of languages.

BACKGROUND OF THE INVENTION

The problem of writing error-free computer programs has plagued programmers since the very beginning. Sophisticated schemes for automatically discovering program errors and bugs of all kinds, including lexical, syntactic, semantic and logical, have been developed. However, these schemes have generally been directed to enforcing adherence to concrete programming standards inherent in the definition of the programming language itself and not to more extrinsic quality-related concerns, such as language evolution, portability, testing costs and language-specific feature exploitation. Many of these quality-related concerns can be expressed as rules amenable to automated implementation.

The first of these quality-related concerns is caused by the inevitable evolution of programming languages through the extension of features or the introduction of an entirely new language superset. For example, the C programming language has been extended to become the object-oriented C++ programming language. The problem with language evolution is that programmers familiar with the original language often cling to the same old programming practices more out of habit than good sense. Moreover, features formerly preferred have sometimes been refined or replaced by new features in the successor language, yet are largely ignored in favor of the old.

Another concern is portability. Experienced programmers are generally aware of the horizontal portability concerns for different target computing platforms. However, vertical portability concerns relating to the migration of language features to a standardized version of the language, such as an ANSI/ISO standard, are easily overlooked, especially when a compiler fails to implement or acknowledge the proposed standardized features.

A third concern is avoiding unnecessary software testing which is labor intensive and accounts for approximately 50 percent of commercial software development costs. Often, the need to test software is caused by poor or inefficient programming practices. A more disciplined programming style would help diminish testing costs in many cases.

Finally, a concurrent concern to language evolution is a need to fully exploit the language-specific features of the chosen programming language. For instance, two features of the C++ programming language are type safety and extensibility, features formerly unavailable in the C language. Even seasoned C language programmers can sometimes overlook these features.

Other quality-related problems are caused by inexperience or lack of exposure to other programmers. As in most disciplines, knowledge of a preferred solution to a commonly encountered problem is generally passed from programmer to programmer in the time-honored oral tradition. This also means that a programmer will only grow insofar as he is able to obtain exposure to other programmers. It is unlikely a lone programmer will quickly adopt a new solution to a solved problem absent some guidance from a sage source.

One system for checking software based on rules is embodied in a computer program called lint++, as described in S. Meyers, *Effective C++ 50 Specific Ways to Improve Your Programs and Designs*, p. xi (Addison-Wesley 1992), the disclosure of which is incorporated herein by reference. Another system for checking software based on rules is embodied in a computer program product called CodeAdvisor, manufactured by Hewlett-Packard Company, Palo Alto, Calif., and described in E. Bailey, *C++ SoftBench CodeAdvisor 5.0*, SoftBench Insights, pp. 5–6 (December 1995), the disclosure of which is incorporated herein by reference.

However, these systems only focus on the particular software constructs for the C++ programming language and require rules that are reliant on detailed source code information stored in a static database. More importantly, none of the mentioned systems provide a quick, easy, and user-friendly method of generating user-defined rules that is independent of programming languages.

Therefore, what is needed is a system and method for graphically generating user-defined rules for checking computer language or source code quality that is independent of programming languages. Such a system and method would operate beyond the boundaries of the raw programming language definition and impart expert programming language knowledge by applying easily generated rules embodying extrinsic quality-related concerns, such as language evolution, portability, testing costs and language-specific feature exploitation. In general, a system and method for graphically generating user-defined rules for checking a defined relationship between a set of given information is needed.

SUMMARY OF THE INVENTION

Accordingly, the present invention enables the above problems to be overcome by providing a method and system for graphically generating user-defined rules to be used for checking quality and/or relationships of information in languages or set of given information. The created rules are usable by any compatible language. Rules are created by selecting a main node. Additional elements are added in a flow-chart-like representation to complete the graphical creation of the rule.

One embodiment of the present invention is a method and system for graphically generating user-defined rules to be used for checking the quality of a computer programming language. The created rules are usable by any compatible programming language. A Graphical User Interface (GUI) with a plurality of menus provides easy and effective means for generating user-defined rules. Generally, each rule comprises a node type associated with a matching function.

Nodes and their properties are graphically generated and connected to construct rules. Each instruction in a computer programming language is represented by at least one node of a particular type stored in a parse tree for describing dependencies between such nodes. Both the parse tree and the rules are stored in the computer.

The parse tree is searched beginning from a root node indicating an entry point into the parse tree for at least one of the nodes having such a particular type matching one of the node types. The matching function associated with the matched node type is performed for analyzing the instruction represented by the node of the matched particular type by further searching the parse tree beginning from the node having the matched particular type and identifying a quality concern based on the results therefrom. An error message is generated for describing the quality concern identified by the matching function.

Because the rules are expressed in a high-level image, the underlying code can be optimized for the machine, language, or rule types. For example, sometimes rules can be combined into a single check. Additionally, the actual rule is completely portable between machines and engines, regardless of how or where the engine is running. Furthermore, some simple concepts can have many special cases in the parse tree. Representing these concepts abstractively as high-level concepts ensures that the rule will handle all (automatically handle-able) special cases. In contrast, user-written rules in terms of codes often mishandle many special cases which are hidden by the high-level rule.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIGS. 15A–15H are examples of GUI screens displayed for creating a new rule;

FIGS. 16A–16G are examples of further GUI screens displayed for creating a new rule;

DETAILED DESCRIPTION

An example of a method and system for automatically checking source code quality based on given rules is described in U.S. Pat. No. 5,860,011, entitled "METHOD AND SYSTEM FOR AUTOMATICALLY CHECKING COMPUTER SOURCE CODE QUALITY BASED ON RULES," the entire contents of which are hereby incorporated by reference.

Figure 1:
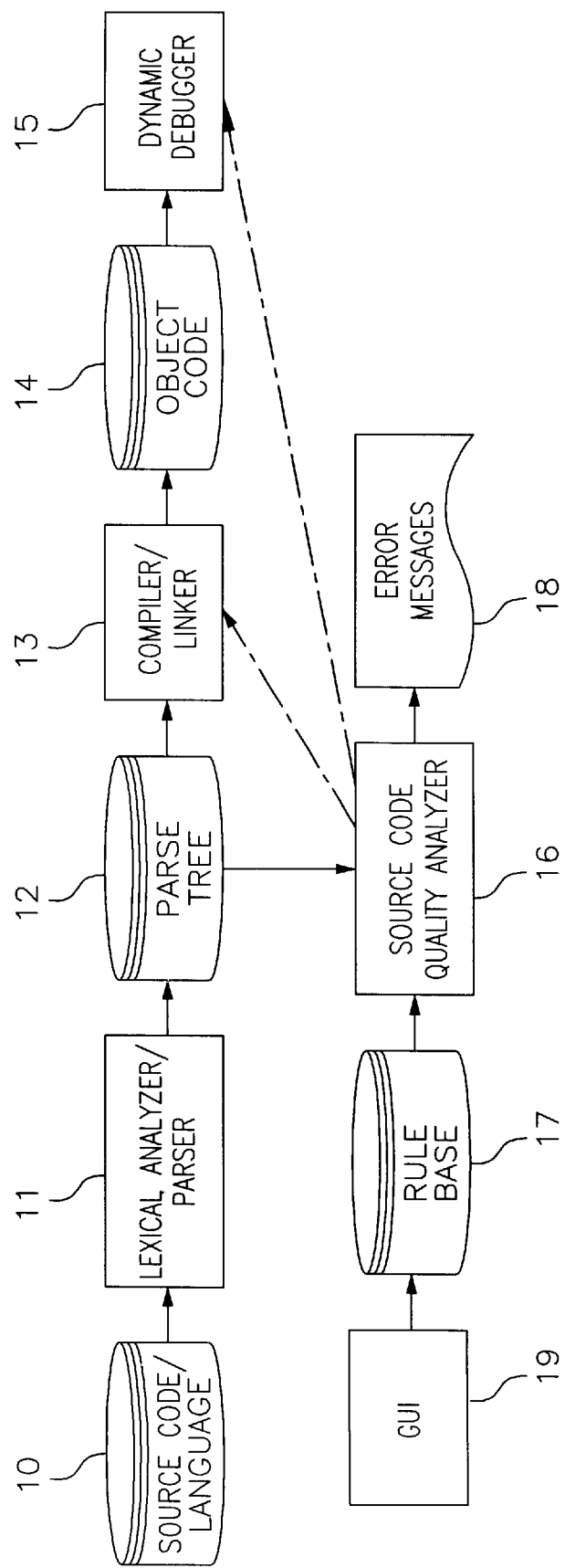
FIG. 1 is a functional block diagram of a system for automatically checking computer source code quality constructed in accordance with the present invention.

I. System For Graphically Generating User-defined Rules To Be Used for Checking Computer Programming Language Quality A. System Structure Referring to FIG. 1, a functional block diagram of one embodiment of a system for automatically checking computer source code quality constructed in accordance with the present invention is shown. It is understood by those skilled in the art that the present invention is not limited to programming languages. The present invention is capable of checking the quality of any type of language, such as English language or any type of relationship between a given set of information. In the exemplary embodiment of FIG. 1, the source code or 10 is preferably organized into files which are stored on a secondary storage device (not shown). In the case of a source code, the source code or language 10 contains a series of programming language instructions. In the described embodiment, the C++, JAVA® and HTML programming languages are supported, although support of other programming languages is feasible.

The source code 10 comprises all types of files used to express an uncompiled, that is, non-object code, computer program, including definitional and declarative files. For example, in the C++ programming language, header files are declarative files since they frequently declare but do not define program variables, structures, functions and classes. Source code files, however, are definitional files since they typically contain definitions of program variables, structures, functions and classes.

The source code or language 10 is received as input to a lexical analyzer/parser 11 which is conventional in the art.

The lexical analyzer scans the source code or language 10 and groups the instructions or relationships into tokens. The parser performs a hierarchical analysis which groups the tokens into grammatical phrases that are represented by a parse tree 12. Each instruction is represented in the parse tree 12 by at least one node with interconnecting paths representing dependencies between each token. Each node also is of a particular type, such as PLUS_EXPR which is an addition expression node. A source code listing of node types as used in the described embodiment is provided in Appendix A.

The parse tree 12 is used by both a compiler/linker 13 and source code quality analyzer 16. The compiler/linker 13 transforms the parse tree 12 into executable object code 14 and is conventional in the art. The compiler translates the grammatical phrases stored in the parse tree 12 into individual object modules (not shown) which the linker links and combines with external library function modules (not shown) to create object code 14.

The resulting executable computer program, as embodied in the object code 14, can be dynamically tested with the dynamic debugger 15 for identifying runtime errors. The dynamic debugger is conventional in the art. An example of such a dynamic debugger 15 is the INSURE® dynamic debugger product manufactured by Parasoft Corporation, Monrovia, Calif. (INSURE® is a registered trademark owned by Parasoft Corporation).

The parse tree 12 can be analyzed by the source code quality analyzer 16 prior to compilation by the compiler/linker 13 for automatically checking the quality of the source code or language 10. The Graphical User Interface (GUI) 19 which is constructed in accordance with the present invention provides the user with different menus and options to create rules for a rule base 17, as further described in Section II.

The source code quality analyzer 16 accesses the rule base 17 that stores a set of rules for identifying quality concerns, as further described herein below in Section I.B. Each rule in the rule base 17 is selected by the source code quality analyzer 16 and the parse tree 12 is searched for a match between a node representing those particular types of instructions being scrutinized for quality concerns reflected in the current rule. Upon encountering a matching node, the parse tree is further analyzed and the particular type of quality concern is identified. Error messages 18 are generated for identifying the quality concern identified. Optionally, the source code quality analyzer 16 can directly invoke the compiler/linker 13 or the dynamic debugger 15.

B. Rule Base Description

In one embodiment, rules base 17 comprises rules describing quality-relayed concerns for source code or language 10 written in the C++ programming language. An example of these rules is set forth in Table I wherein the first column identifies the rule number which corresponds to an item number as described in *S. Meyers, Effective C++ 50 Specific Ways To Improve Your Programs and Designs*, p. Xi (Addison-Wesley 1992), as cited herein above, and the second column describes the quality-related concern addressed by the rule.

TABLE I

| Rule Number | Description |
| --- | --- |
| 02 | Prefer iostream.h to stdio.h. |
| 03 | Use new and delete instead of malloc and free. |
| 05 | Use the same form in corresponding calls to new and delete. |

TABLE I-continued

| Rule Number | Description |
| --- | --- |
| 06 | Call delete on pointer members in destructors. |
| 07 | Check the return value of new. |
| 08 | Adhere to convention when writing new. |
| 09 | Avoid hiding the global new. |
| 10 | Write delete if new is used. |

Each rule operates on nodes in the parse tree 12 to identify a pattern of nodes unique to the particular rule. User-defined rules can be added to the rule base 17 by simply using the GUI 19 to create new rules.

In one embodiment of the present invention, rule base 17 includes created rules for non-programming languages such as English or French. In another embodiment of the present invention, rule base 17 may include created rules for searching for a specific pattern in a given data set which can be broken down into smaller nodes with a defined relationship between them. For instance, a user might want to enforce a function limit of fifteen per file, or might want a rule that lists the number of functions per file.

C. Method for Automatically Checking Computer Source Code Quality

Figure 2:
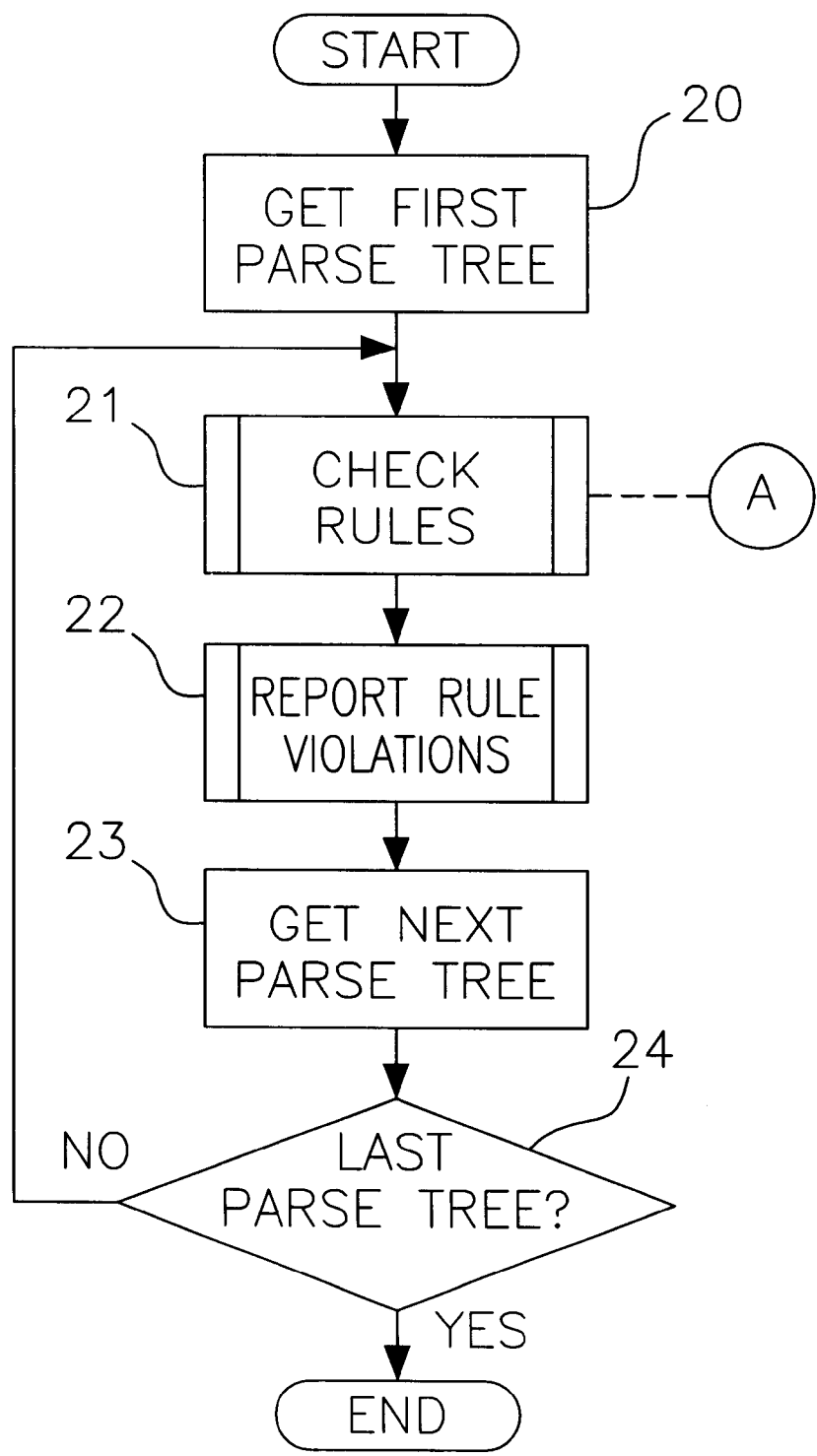
FIG. 2 is a flow diagram of a method for automatically checking computer source code quality in accordance with the present invention.

Referring to FIG. 2, a flow diagram of a method for automatically checking computer source code quality is shown. The quality of the source code or language 10 is checked on an individual parse tree basis. One parse tree 12 is stored per file and each parse tree 12 is iteratively selected by a control loop (blocks 21–24) until all of the parse trees 12 have been selected.

A first parse tree 12 is obtained (block 20). The instructions for the corresponding source code or language 10 as represented by nodes in the parse tree 12 are checked for rule violations (block 21) as further described herein below in FIG. 3. Any rule violations found are reported to the user as error messages that identify the quality concern identified (block 22). The next parse tree 12 is obtained (block 23), and if it is not the last parse tree 12 (block 24), control returns to the top of the control loop (blocks 21–24) for further processing. Otherwise, all parse trees 12 have been processed and the method terminates.

Figure 3:
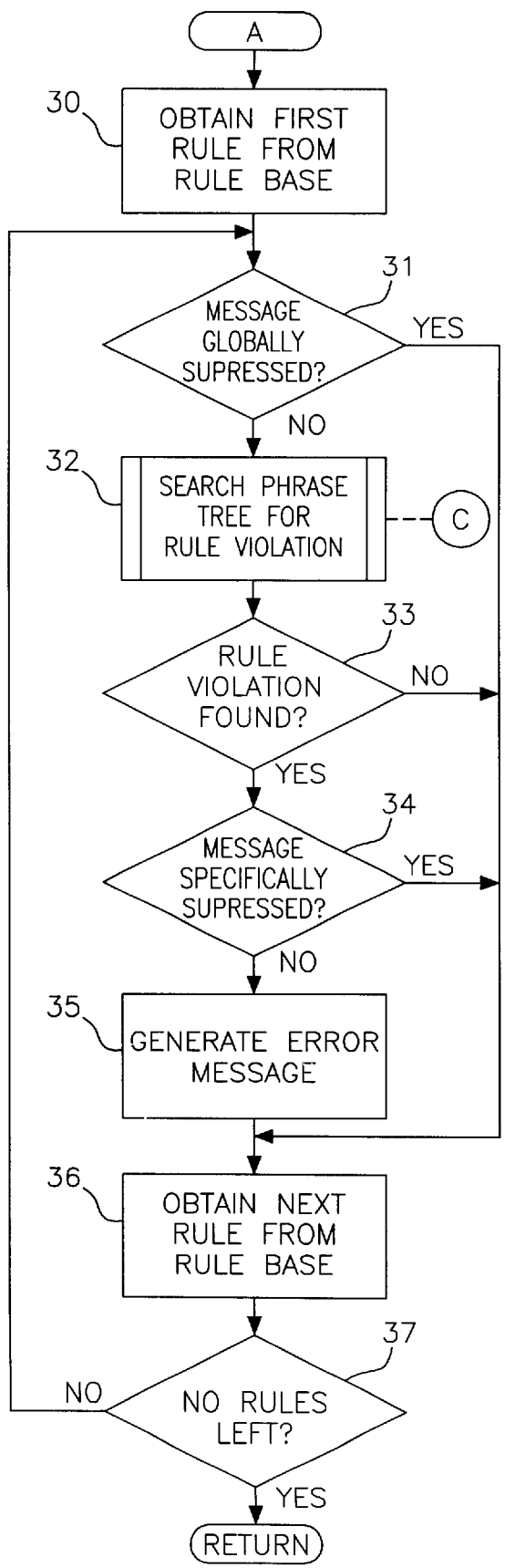
FIG. 3 is a flow diagram of a function for checking for rule violations.

Referring to FIG. 3, a flow diagram of the function for checking for rule violations (block 21) of FIG. 2 is shown. It operates by iteratively processing each rule in the rule base 17 using a main control loop (blocks 31–37) until all the rules have been processed. The function will now be described.

A first rule is obtained from the rule base 17 (block 30). If the error message associated with the obtained rule has been globally suppressed (block 31), all further processing of the rule is suspended and control continues towards the bottom of the control loop (blocks 31–37) by obtaining the next rule in the rule base 17 (block 36). Two types of message suppression are employed. Global message suppression operates in a context-free manner, that is, without reference to the parse tree 12. A rule that is globally suppressed is either in the list of suppressed rules or not. Specific message suppression operates in a context-sensitive manner. Information from the parse tree 12 is required for determining whether the rule is suppressed. For example, a rule could be specifically suppressed with reference to a particular class or file in the source code 10.

If a message associated with an obtained rule is not globally suppressed (block 31), the rule is further processed by first searching the parse tree for a rule violation (block 32) as further described herein below in FIG. 4. If no rule violation is found (block 33), control resumes toward the bottom of the control loop (blocks 31–37) by obtaining the next rule in the rule base 17 (block 36).

Otherwise, if a rule violation has been found (block 33), yet the message has also been specifically suppressed (block 34), control resumes toward the bottom of the control loop (blocks 31–37) by obtaining the next rule in the rule base 17 (block 36). Otherwise, if the message has not been specifically suppressed for the current rule (block 34), an error message is generated (block 35) and the next rule in the rule base 17 is obtained (block 36). If there are still rules left in the rule base 17 (block 37), control continues at the top of the control loop (blocks 31–37) for further processing. Otherwise, if no rules are left (block 37), the function returns.

Figure 4:
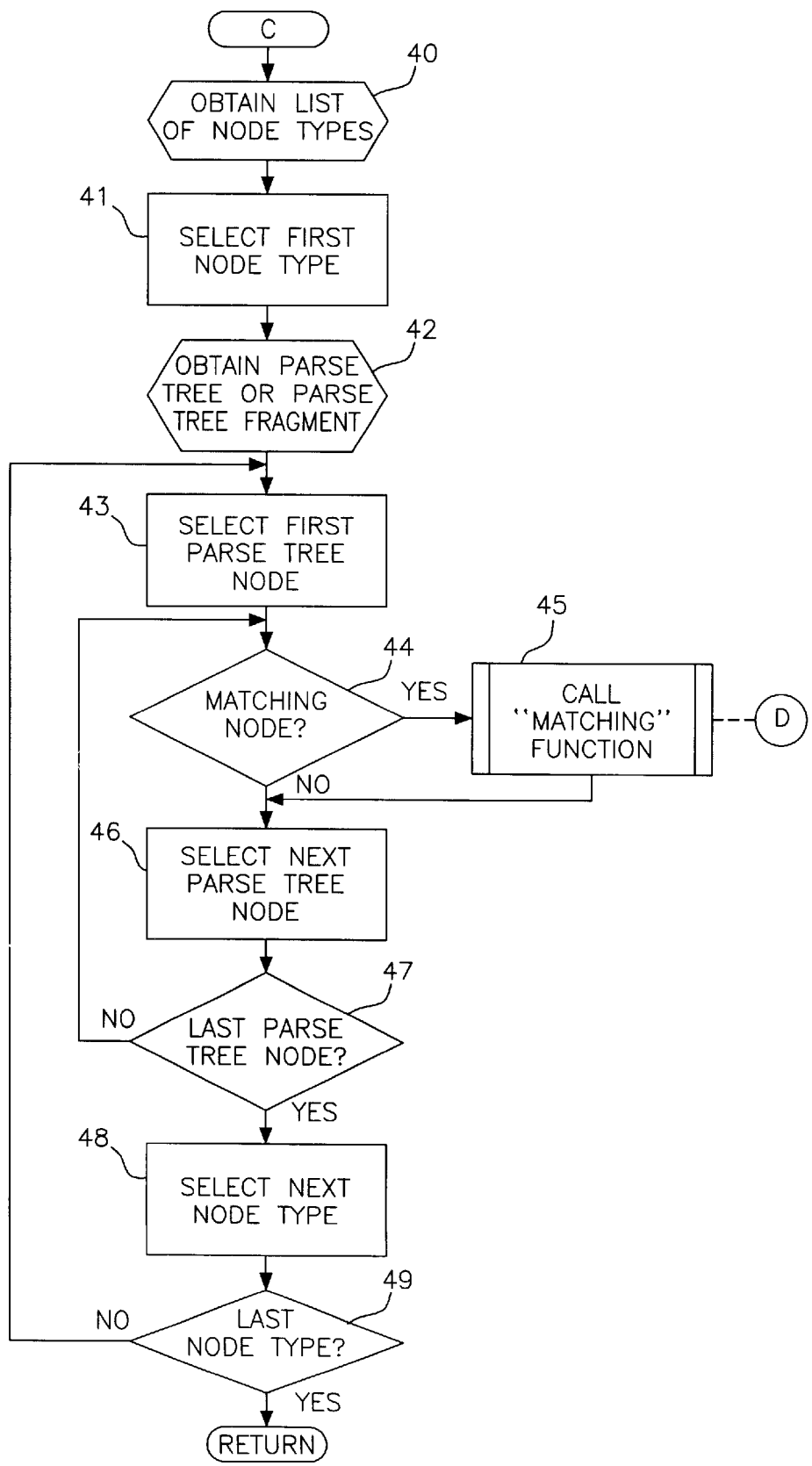
FIG. 4 is a flow diagram of a function for searching a parse tree for a rule violation.

Referring to FIG. 4, a flow diagram of the function for searching a parse tree for a rule violation (block 32) of FIG. 3 is shown. It operates using a pair of nested control loops that iteratively process each node type (blocks 43–49) and parse tree node (blocks 44–47). The function will now be described.

A list of node types is obtained for the current rule (block 40) and a first node type is selected from the list (block 41). A parse tree 12 (or parse tree fragment), such as described herein above in Section I.B., is obtained (block 42). The first node in the parse tree is selected (block 43) and if the selected parse tree node matches the selected node type (block 44), a "matching function" associated with the current rule is called (block 45), as further described herein below in FIG. 5.

Otherwise, if the parse tree node does not match the node type (block 44), the next node in the parse tree is selected (block 46). If it is not the last node in the parse tree 12 (or parse tree fragment) (block 47), control returns to the top of the inner control loop (block 44–47) for further processing. Otherwise, if the last parse tree node has been selected (block 47), the next node type is selected from the list of node types for the current rule (block 48). If the last node type has not been selected (block 49), control returns to the top of the outer control loop (blocks 43–49) for further processing. Otherwise, if the last node type has been selected (block 49), the function returns.

Figure 5:
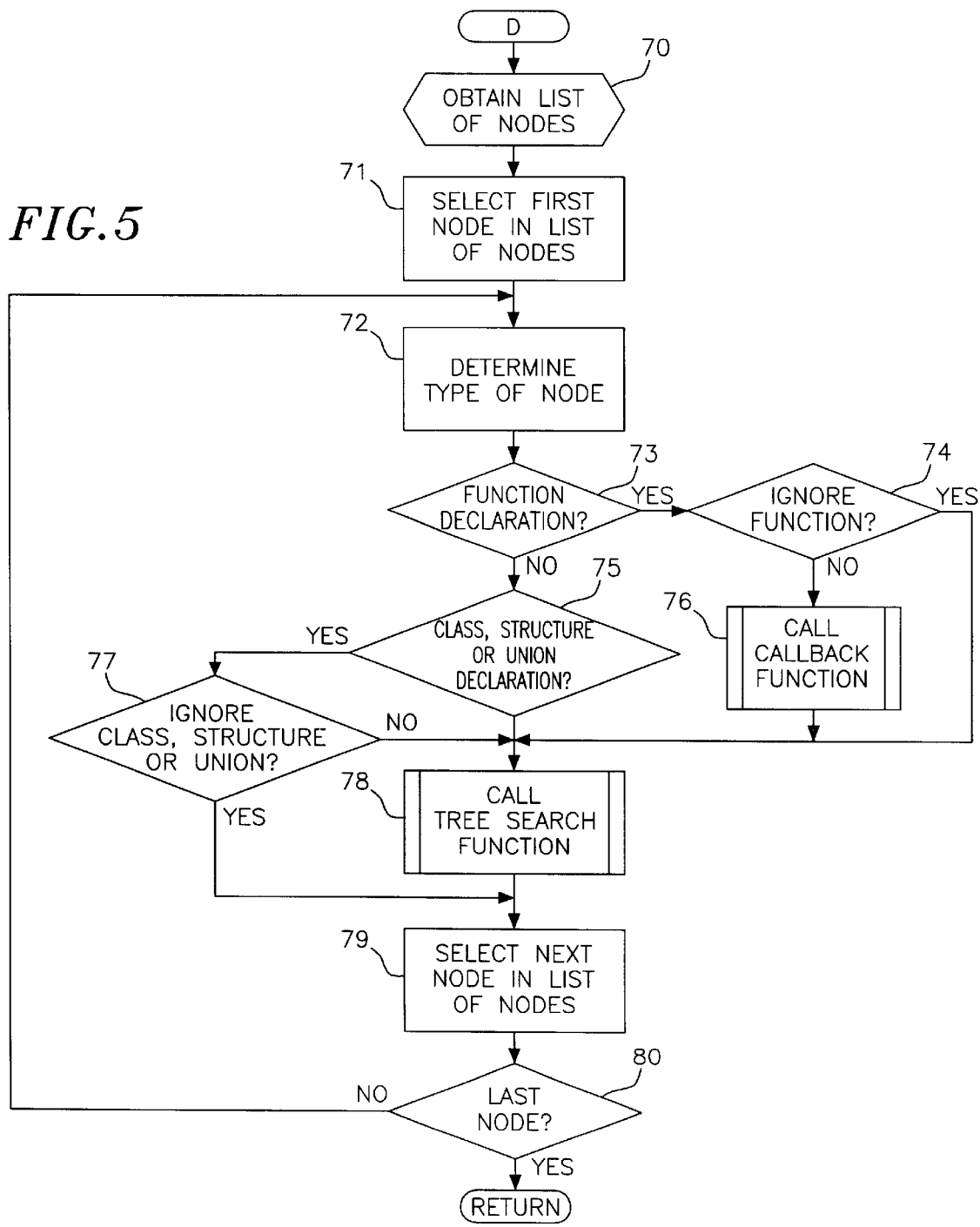
FIG. 5 is a flow diagram of a method for graphically generating and executing user-defined rules.

Referring to FIG. 5, a flow diagram of the "matching function" associated with the current rule (block 45) of FIG. 4 is shown. It operates by iteratively processing each node in a list of nodes for describing the characteristics of the particular rule from the rule base 17 using a main control loop (blocks 72–80) until all the nodes have been processed. The function will now be described.

The list of nodes for the particular rule is obtained (block 70) and the first node in the list of nodes is selected (block 71). The type of the selected node is determined (block 72). If the node corresponds to a function declaration (block 73) yet the function should be ignored (block 74), control resumes toward the bottom of the control loop (blocks 72–80) by calling a tree search function (block 78) as further described herein below. A function is ignored (block 74) as a form of suppression based on the context of the match between the parse tree node and the node type (block 44 of FIG. 4). The structure of the parse tree 12 may contain inherent ambiguities which can result in false rule violation detection without suppression.

If the function is not ignored (block 74), the callback function for a potential violation of the particular rule is called (block 76). Each rule has an associated callback function that is called whenever a particular event takes place. It is a generic mechanism for registering the rule violation by processing the callback function as a type of interrupt handler. Once a rule violation has been determined, the information needed to record an error record is stored.

Each rule in the rule base 17 is used to check the source code or language 10 for a violation of a quality-related concern through an iterative search of the parse tree 12. Several factors can define the particular event which triggers the callback function. In the most general case, this can be the existence of a particular type of node, but can also include a particular sequence or ordering of node types. The callback function specifies the types of nodes that must be matched and which are irrelevant. Other node-based strategies are feasible. The computer source code for the callback functions used in the described embodiment is set forth in the microfiche appendix and is organized by rule numbers matching those set forth in Table I herein above.

If the node corresponds to neither a function declaration (block 73) nor a class, structure or union declaration (block 75), the tree search function is called (block 78). Similarly, if the node corresponds to a class, structure or union declaration (block 75) yet the class, structure or union should not be ignored (block 77), the tree search function is called (block 78). Like a function, the class, structure or union is not ignored (block 77) as a form of suppression based on the context of the match between the parse tree node and the node type (block 44 of FIG. 4). However, if the class, structure or union is ignored (block 77), control resumes toward the bottom of the control loop (blocks 72–80) by selecting the next node in the list of nodes (block 79).

The tree search function (block 78) is necessitated by the structure of the parse tree 12 for helping to guarantee the correct context of a potential rule violation whenever a composite type is found, such as a function, class, structure or union. The function recursively strips fields from nodes in the parse tree 12 until it finds a particular type of token relevant to the current rule. In the described embodiment, this function comprises a case statement for selecting particular types of nodes followed by performing instructions on the corresponding node, although other methods are feasible.

After the tree search function has been called (block 78), the next node in the list of nodes is selected (block 79). If there are still nodes left (block 80), control continues at the top of the control loop (blocks 72–80) for further processing. Otherwise, if no nodes are left (block 80), the function returns. (block 44–47) for further processing. Otherwise, if the last parse tree node has been selected (block 47), the next node type is selected from the list of node types for the current rule (block 48). If the last node type has not been selected (block 49), control returns to the top of the outer control loop (blocks 43–49) for further processing. Otherwise, if the last node type has been selected (block 49), the function returns.

II. Graphically Generating User-defined Rules

Generally, creating a rule results in creating a pattern that is not allowed to appear in a programming language code. A code quality analyzer checks for instances of the created pattern and reports errors accordingly. A GUI with a plurality of menus provides easy and effective means for generating user-defined rules. Typically, each rule comprises a node type associated with a matching function. Nodes and their properties are graphically generated and connected to construct rules. In one embodiment, the GUI includes two major areas, an index pane and a graphic pane. The nodes available for use in rules are listed in the index pane within the GUI. Once a parent rule node is created, a rule node is displayed in the graphic pane of the GUI.

Additionally, certain properties may have properties of their own, i.e., "sub-properties." For example, in C++ language, a "class" node has a "parent" property, which is the class or classes it derives from. The "parent" property has a property of its own, namely, "permissions," which can take the value of public, protected, or private, describing more specifically how the parent relates to the child.

The rule can be modified by selecting any rule node and choosing the desired command(s) from a menu within the GUI. Examples of commands include; Modify command to modify the selected rule node, Delete command to delete the selected rule node, Create Collector command (described below) to graphically add a collector to the selected node; and Create Output command to add an output to the selected rule node (an output tells the quality analyzer to report an error if the specified rule is true). Nodes can be organized in folders that contain nodes of similar types, for example, Constants, Variable, Expressions, Types, and the like. Both nodes and folders containing nodes can be used as rule nodes. In one embodiment, moving a cursor over a rule in the graphic pane displays the name of the rule node in the GUI.

Figure 6:
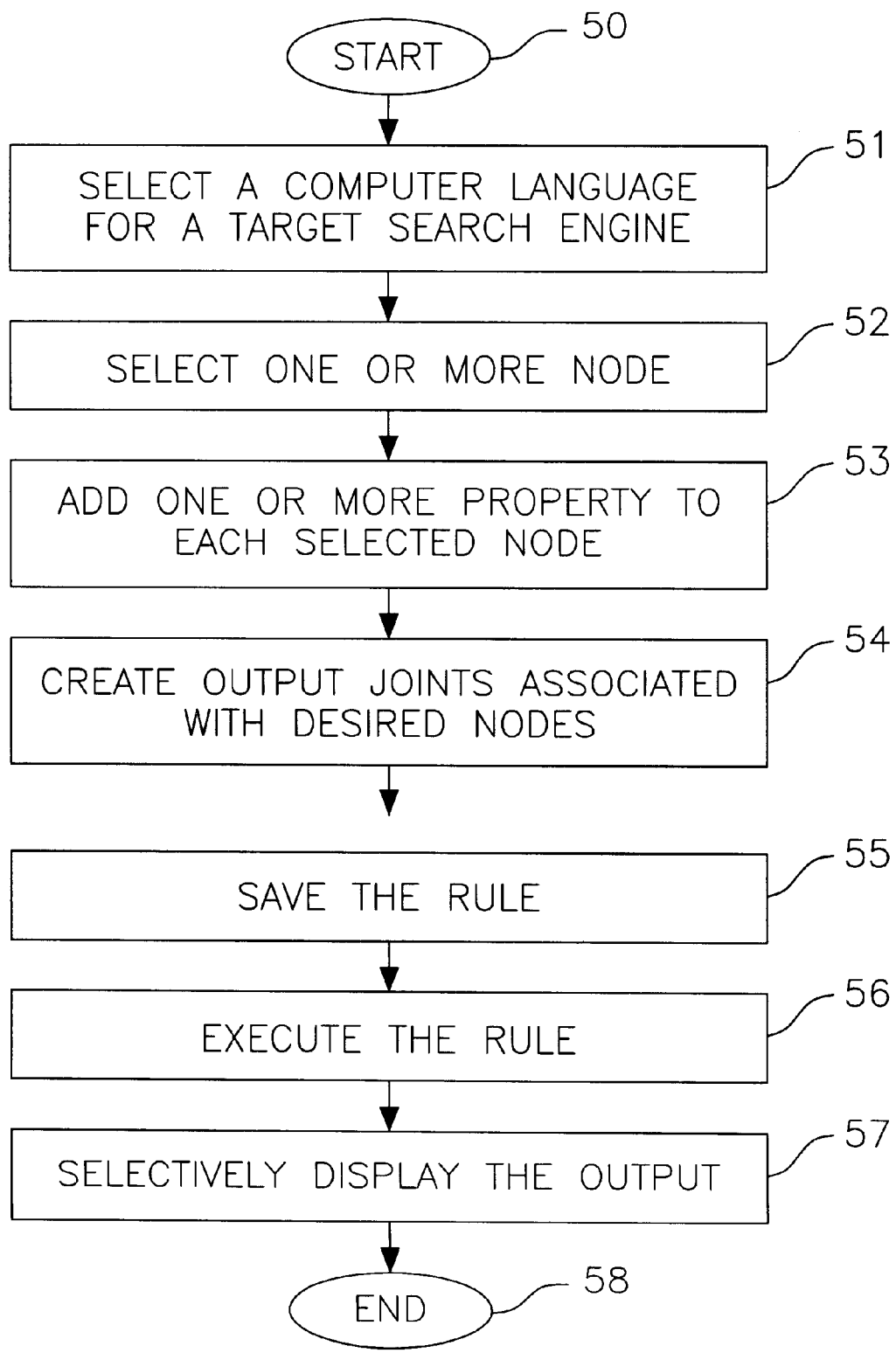
FIG. 6 is a flow diagram of a "matching function" associated with a current rule.

A flow diagram of a method for graphically generating user-defined rules is depicted in FIG. 6. In block 51, a computer programming language for a target quality analyzer 16 is selected. Examples of different computer languages include JAVA®, C++, HTML, and the like. Once the computer programming language is selected, a plurality of nodes, attributes, and functions related to the selected programming language is made available to the user within the GUI. Then, as shown in block 52, one or more node is selected as building blocks for the rule. In block 53, if required, one or more property is added to each node. The properties are available in menus through the GUI. Examples of node property types are: strings, boolean, numbers, nodes, searches, user-defined properties, and the like. A property can contain a node which makes the rule a recursive or composite rule.

The above process is repeated until all the nodes and properties of the rule are built and graphically connected. Next, output joints associated with desired nodes may be created (block 54) to direct output of the node to different points such as to a display for error reporting, to another rule for making composite rules, or directly to the quality analyzer for rule execution. In one embodiment, the rules are loaded from the rule base 17 into the quality analyzer 16 for execution as virtual tables. In block 55, the newly created rule is saved to be used by the quality analyzer 16. This process invokes a file browser in which the rules file name and path can be specified. A dialog box asks a user whether the user wants the rule to be enabled. If the rule is enabled, it is executed by the quality analyzer to perform the desired quality check as shown in block 56.

The saved rule may be used in any other compatible programming language depending on the nodes and properties it contains. In one embodiment, there may be a mapping between similar programming concepts which are expressed differently in different programming languages. For example, the use of "final" in JAVA™ programming language is similar to "const" in C++ programming language. The results and error messages are then displayed in a desired format, as shown in block 57.

Figure 7A:
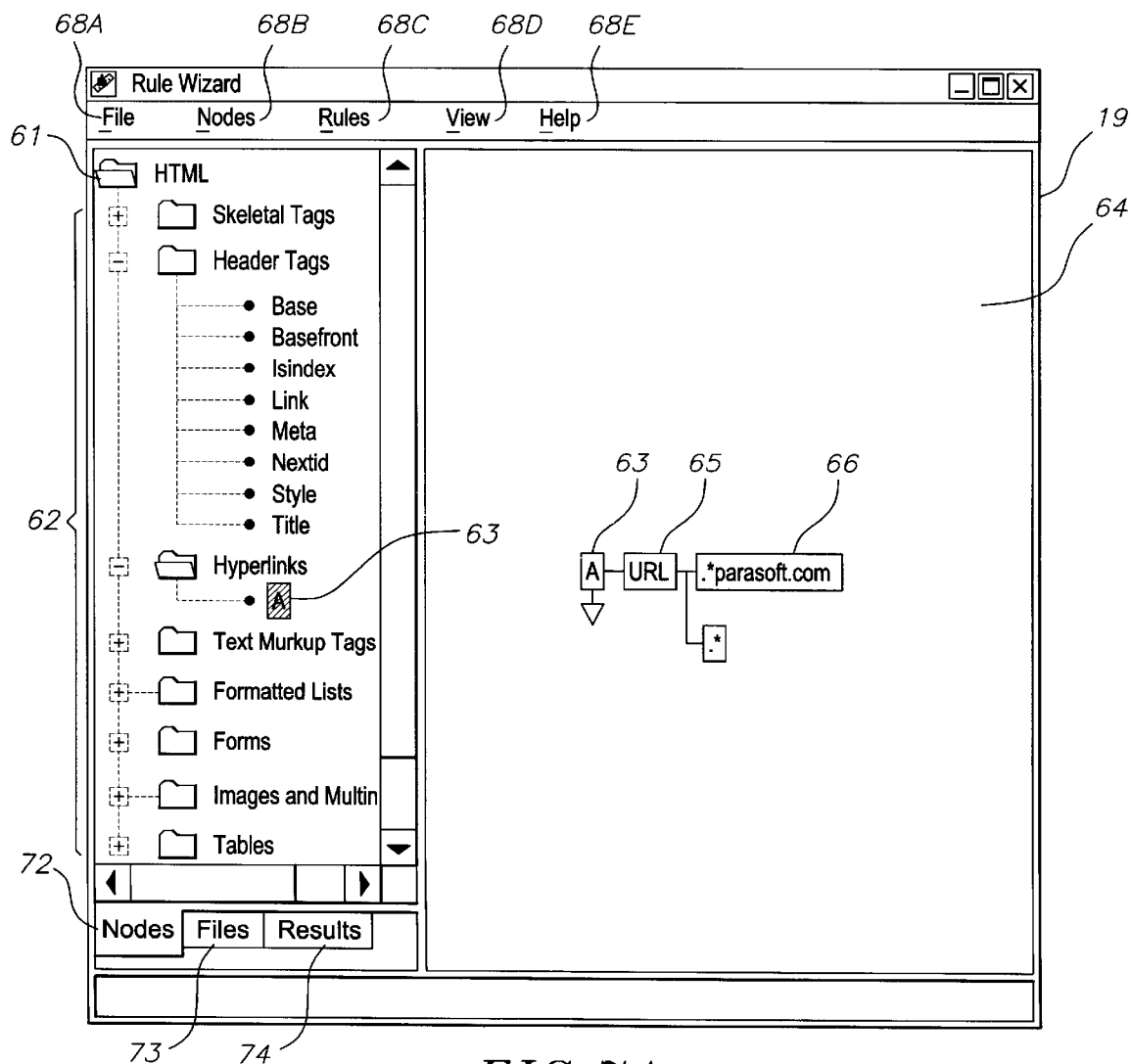
FIG. 7A is an example of a GUI with selected nodes and properties for HTML programming language as an example of a selected programming language.
Figure 7B:
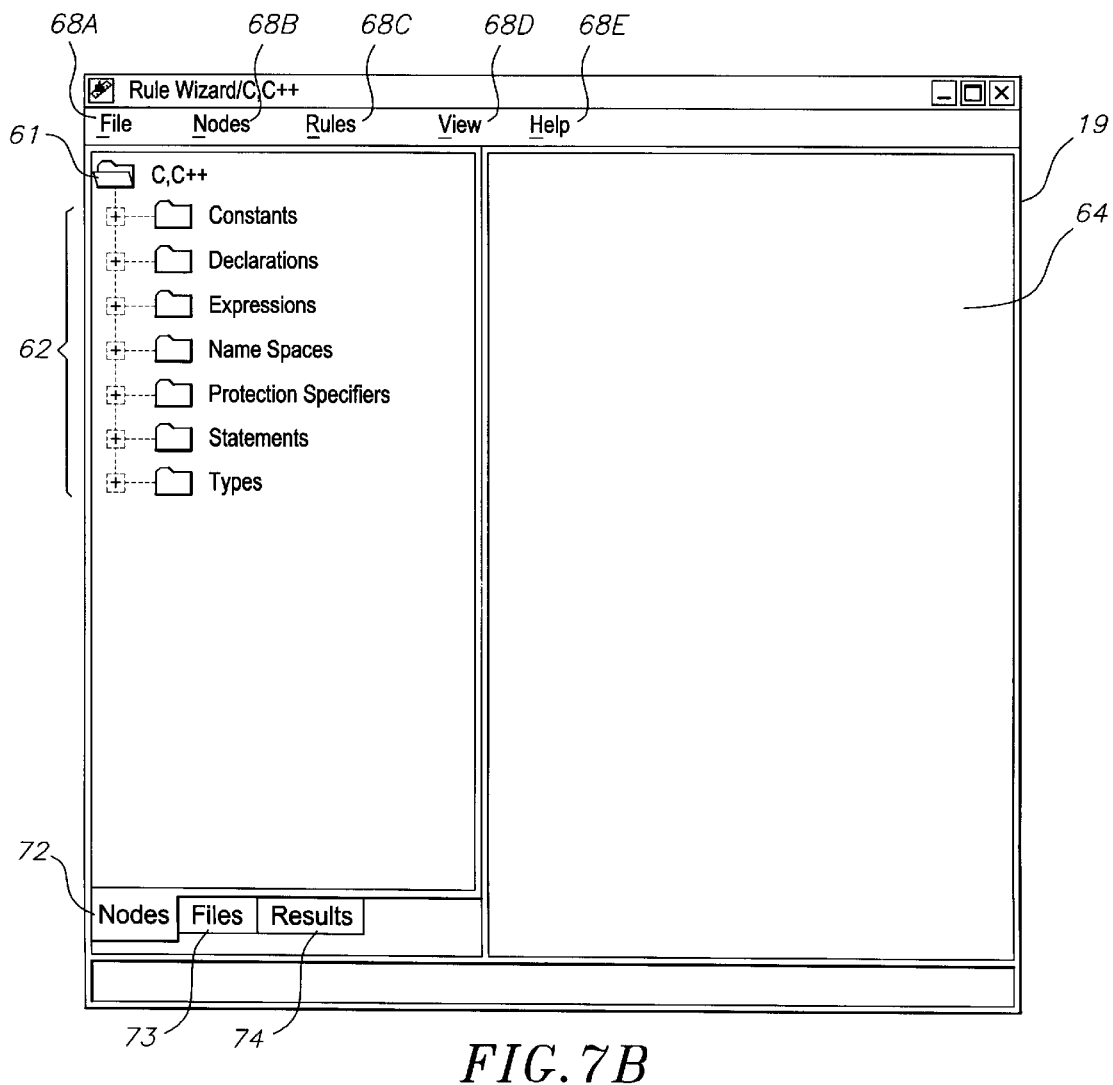
FIG. 7B is an example of a GUI with selected nodes and properties for C/C++ programming language as another example of a selected programming language.

FIG. 7A shows an example for one embodiment of the GUI using HTML and its respective menu 61 as the selected programming language. The related nodes and properties available for use in rules for the selected HTML language are shown in index pane 62. FIG. 7B shows another example for another embodiment of the GUI using C++/C languages and its respective menu 61 as the selected programming language. The related nodes and properties available for use in rules for the selected C++/C language are shown in index pane 62. File menu 68A includes the following commands:

Customize Preferences: Opens a Preferences panel, which allows the user to customize such preferences as rule view and browser.

Save Preferences: Saves the changes the user made in the Preferences.

Print: Prints the contents of the current window.

Exit: Closes the GUI. Any rules that are open when the user exits are saved as the user exits.

Nodes menu 68B includes the following commands:

Properties: Indicates which Node Dictionary the user is currently using.

Node Dictionary: Lets the user choose a Node Dictionary. In this menu item, the user can choose any node dictionary from a list of node dictionaries. For example, the user can selected either of the following node dictionaries:

C++: A dictionary of C++ elements,

HTML: A dictionary of HTML elements,
   Note: The dictionary the user is currently using is preferably "grayed out."

C: This menu item checkbox is filled with red color as default. It indicates that all C-specific elements in the Node Dictionary are shown. When this checkbox is toggled to empty, all C-specific elements in the Node Dictionary are hidden, C++: This menu item checkbox is filled with red color as default. It indicates that all C++-specific elements in the Node Dictionary are shown. When this checkbox is toggled to empty, all C++-specific elements in the Node Dictionary are hidden, and the like.

Rule menu 68C includes the following commands that pertain directly to the current rule in the graphic pane 64 of the GUI:

New Rule: Creates a rule node from which a new rule can be built.

Open Rule: Opens a saved rule.

Close: Closes the current rule.

Save: Saves the current rule; used if the rule has been saved previously and therefore already exists in memory.

Save As: Saves the current rule; used if the rule has not been saved previously. The Save As command gives the user the opportunity to name the rule.

Properties: Allows the user to describe the properties of the current rule, including Rule ID, Header, Severity, Author Description fields, and the like.

View menu 68D includes the following commands:

Show/Hide status bar: Displays/hides the status bar at the bottom of the GUI.

Show/Hide file viewer: Displays/hides the tab which displays the user file tree.

Help menu 68E includes the following commands:

Online Documentation: Displays online manuals.

About . . .: Displays product's version number.

Figure 8A:
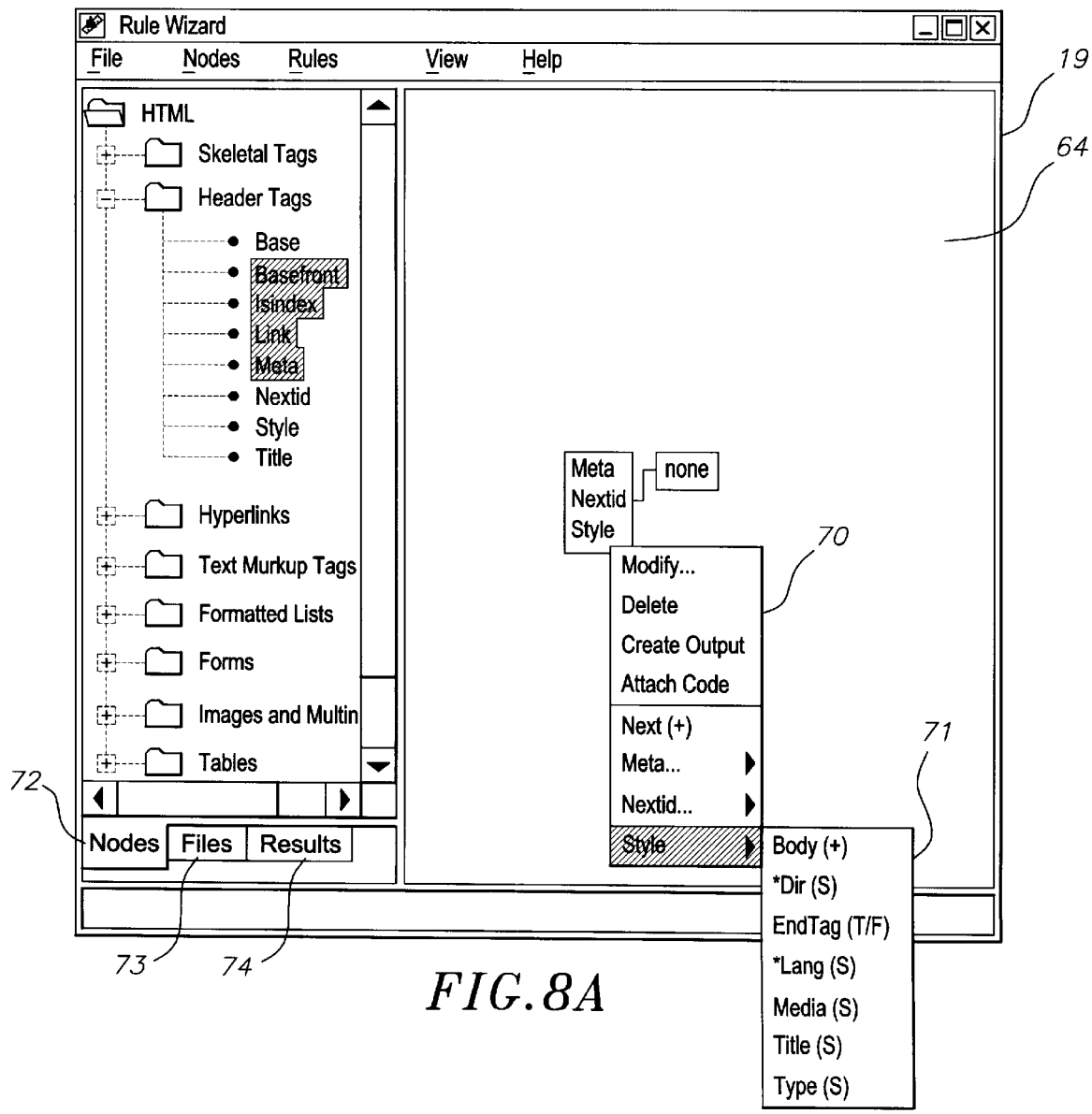
FIG. 8A is an example of a GUI for a pull-down menu for properties or values of each node.
Figure 8B:
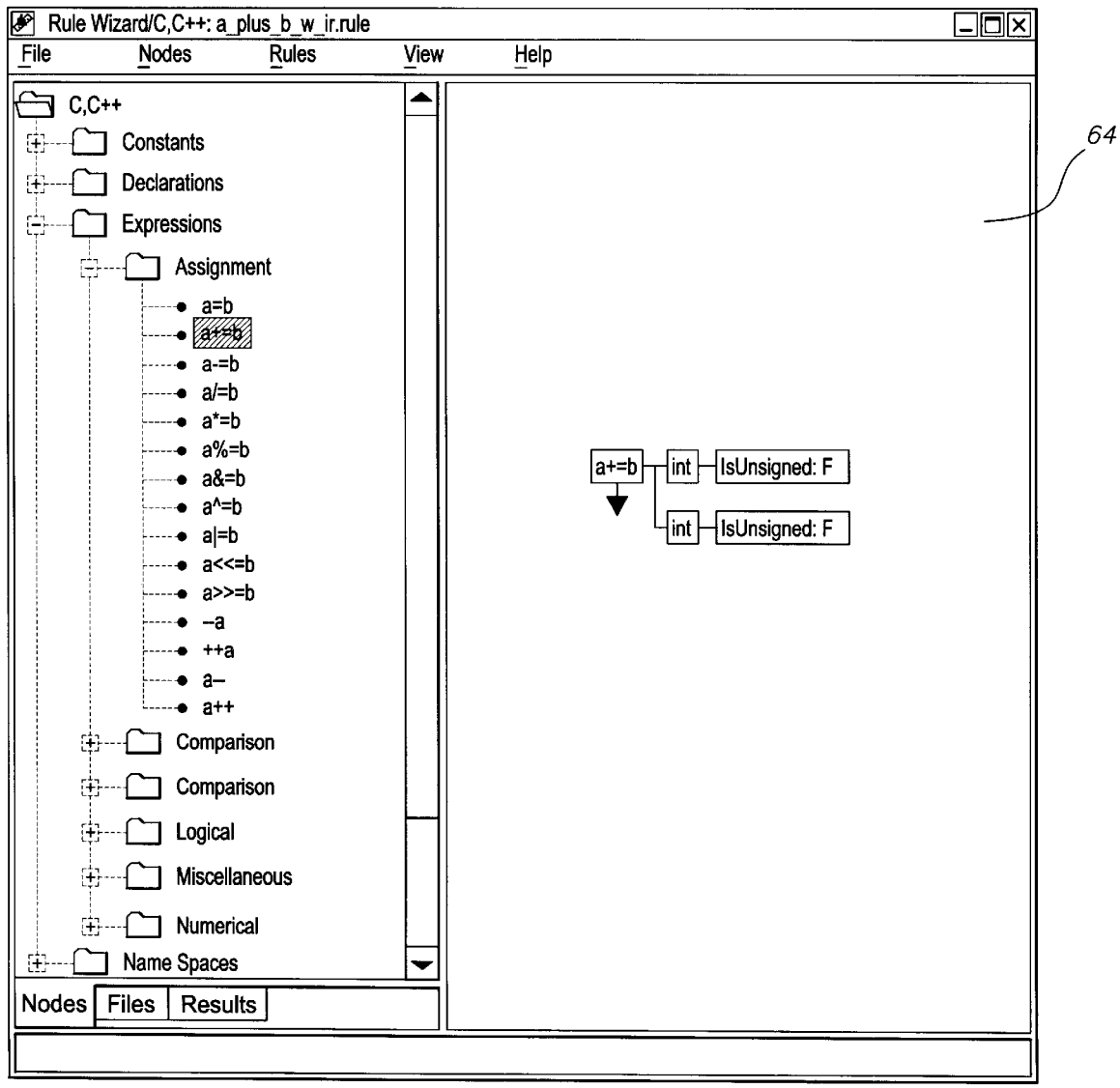
FIG. 8B is an example of a GUI for graphically displaying nodes and their properties or values.

FIG. 8B shows an example of a created rule for a C/C++ language. The created rule is graphically displayed in the graphic pane 64. Referring back to FIG. 7A, an Anchor "A" 63 is selected from the index pane 62 and is placed in graphic pane 64 by dragging it and dropping it in graphic pane 64, as one of the nodes for the rule being built. In the alternative, Anchor "A" is automatically placed and displayed in the graphic pane 64 once Anchor "A" is selected from the index pane 62. Anchors refer to non-linear links among documents, i.e., words or phrases that can be selected to connect to another page or resource.

Pointing the cursor to the node placed in graphic pane 64 and invoking a GUI function provides a pull down menu with all available attributes, types, or values specific to the node, as shown in FIG. 8A. A URL type from menus like menu 70 or menu 71 is selected and placed in the graphic pane 64 of FIG. 7A. Here, a URL (Uniform Resource Locator) is the addressing system used in the World Wide Web and other Internet resources. It contains information about the method of access, the server to be accessed, and the path of any file to be accessed.

Figure 9:
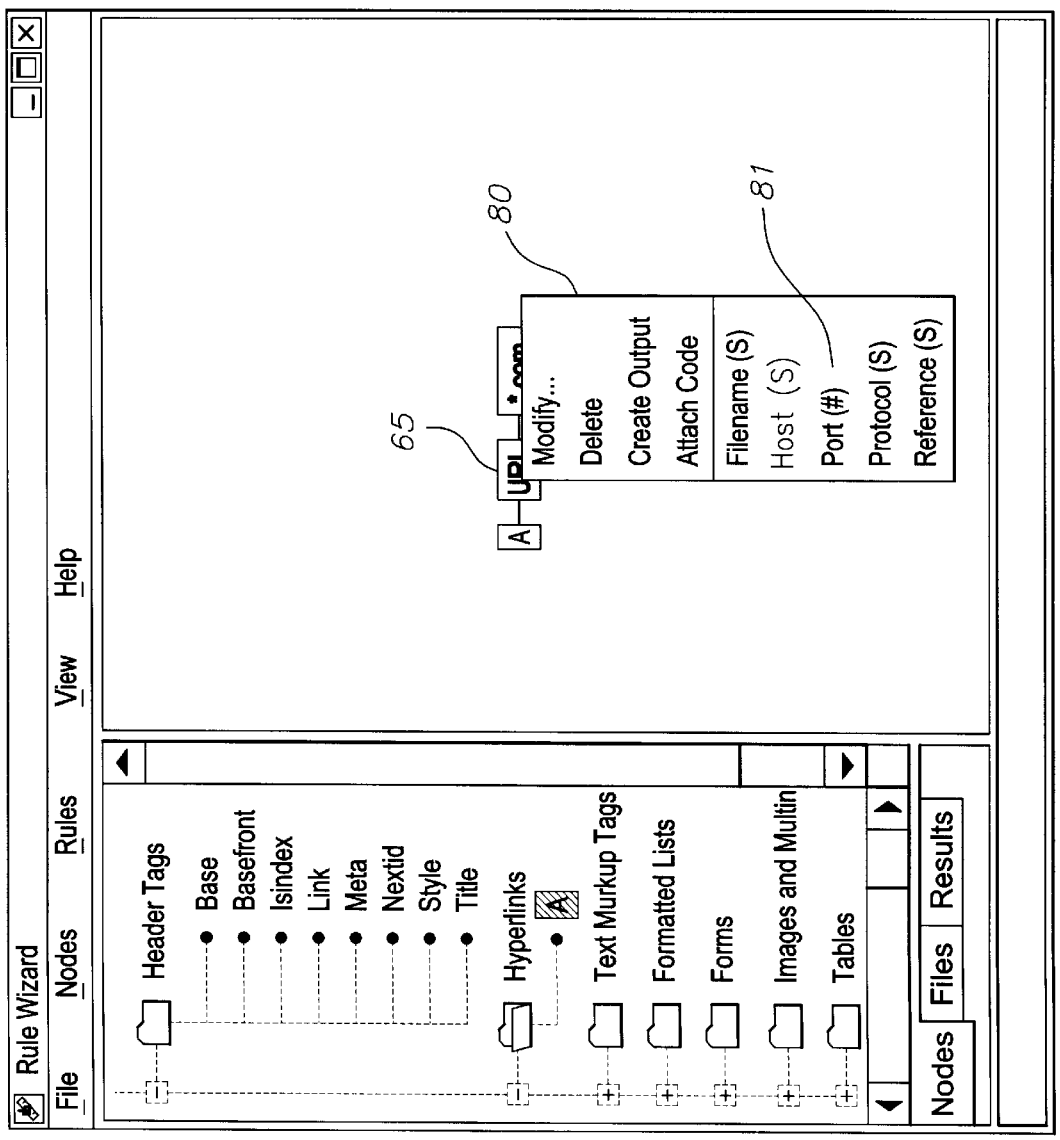
FIG. 9 is another example of a GUI for a pull-down menu for properties or values of each node.
Figure 10:
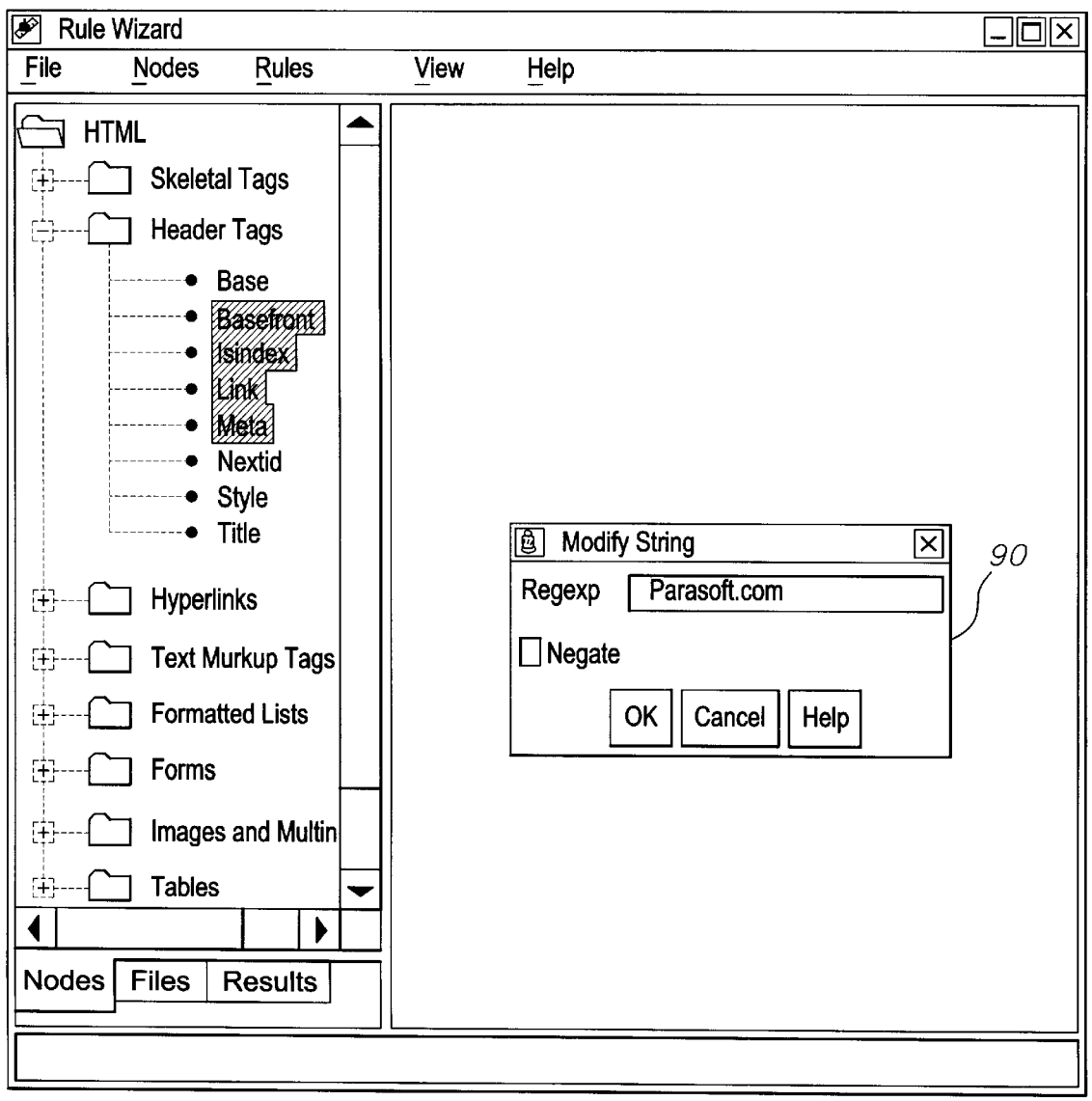
FIG. 10 is an example of a GUI for inputting user-defined values.
Figure 11:
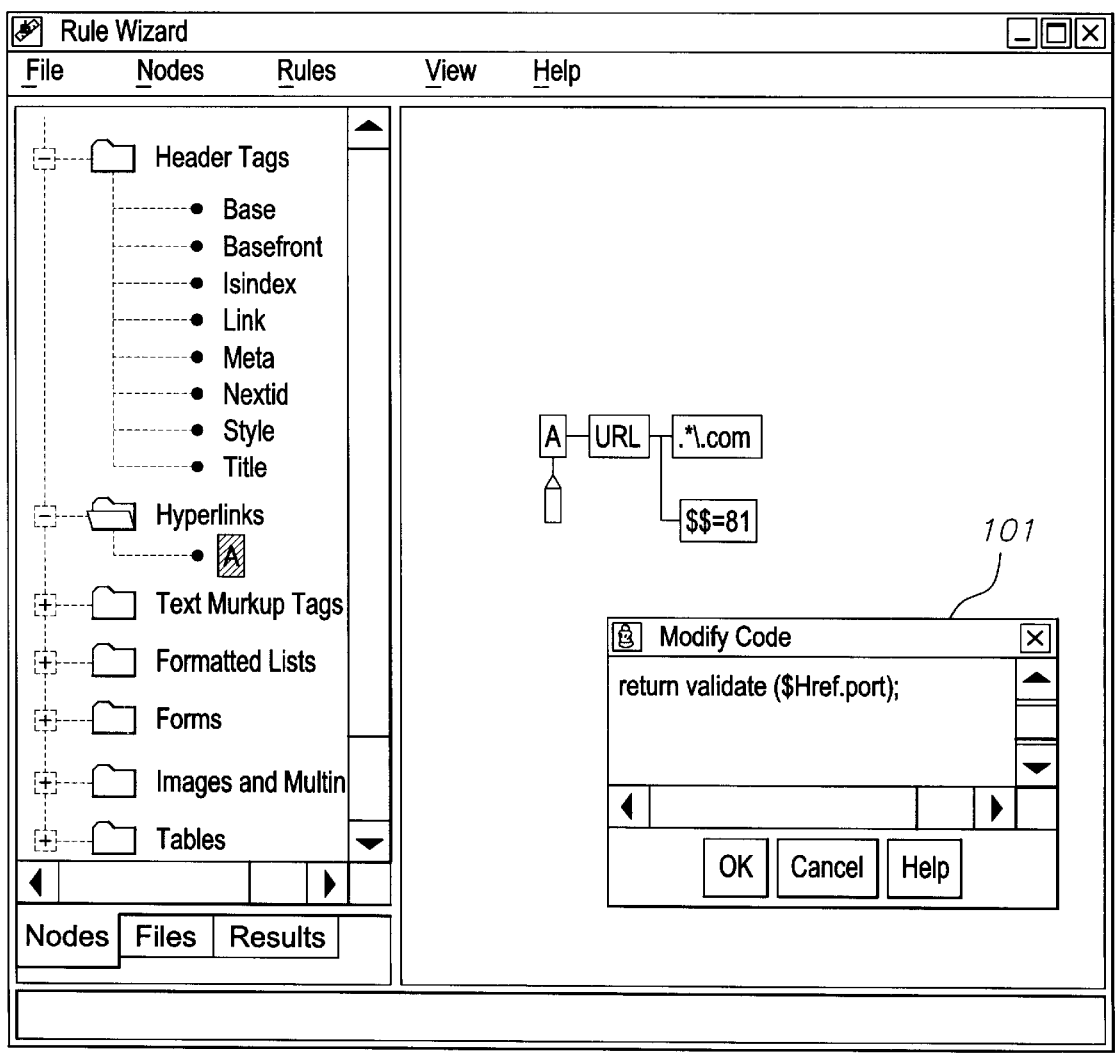
FIG. 11 is an example of a GUI for inputting user-defined node properties.

Next, a menu 80, indicating the attributes for the URL type 65, is provided to the user by pointing the cursor to the URL type 65, as shown in FIG. 9. A property Port(#) 81 for the URL type 65 is selected from the menu 80 and a value ("Parasoft.com") is typed in the Modify String window 90 as shown in FIG. 10. The Port(#) 80 with its given value 66 is then placed in the graphic pane 64. The users can write code in a Modify Code window 101 shown in FIG. 11 to define their own node properties. In this example, the written code gets executed when and if every other condition is satisfied about the rule. Additionally, Action nodes can be attached to perform an action when a condition is found or matched. For instance, if a variable starts with a lower case letter, convert the first character to upper case, i.e., edit the code.

Collector can also be added to a node. If a user attaches a Collector to any node in the rule, then all matching nodes will be collected, and when the rule checking is completed, the Collector's properties are checked. For example, the user might require that a file can have no more than ten functions. Thus, the system searches for function definitions, collects them, and the Collector is triggered (fires) if the count of items collected exceeds ten. Then, the attached output node generates a message like: "Too many functions: 12. This exceeds the limit of 10." Collected nodes can be AND, OR, XOR, and MINUS and combined with other basic functionality. This enables very complex rules to be implemented. Also, existing rules can be attached to some nodes in a new rule as properties. For example, in addition to a visible rule, node X must also satisfy another rule. Rule templates are implemented so that when the user references another rule, the user can set various parameters. For example, in the above "function counting" rule, the user is able to set the maximum number of allowed functions without editing the rule directly, because the rule is able to define a generic set of properties which could be set with a dialog box. In fact, rules attached as properties might have some fields set based on the node which triggered the rule.

Figure 12:
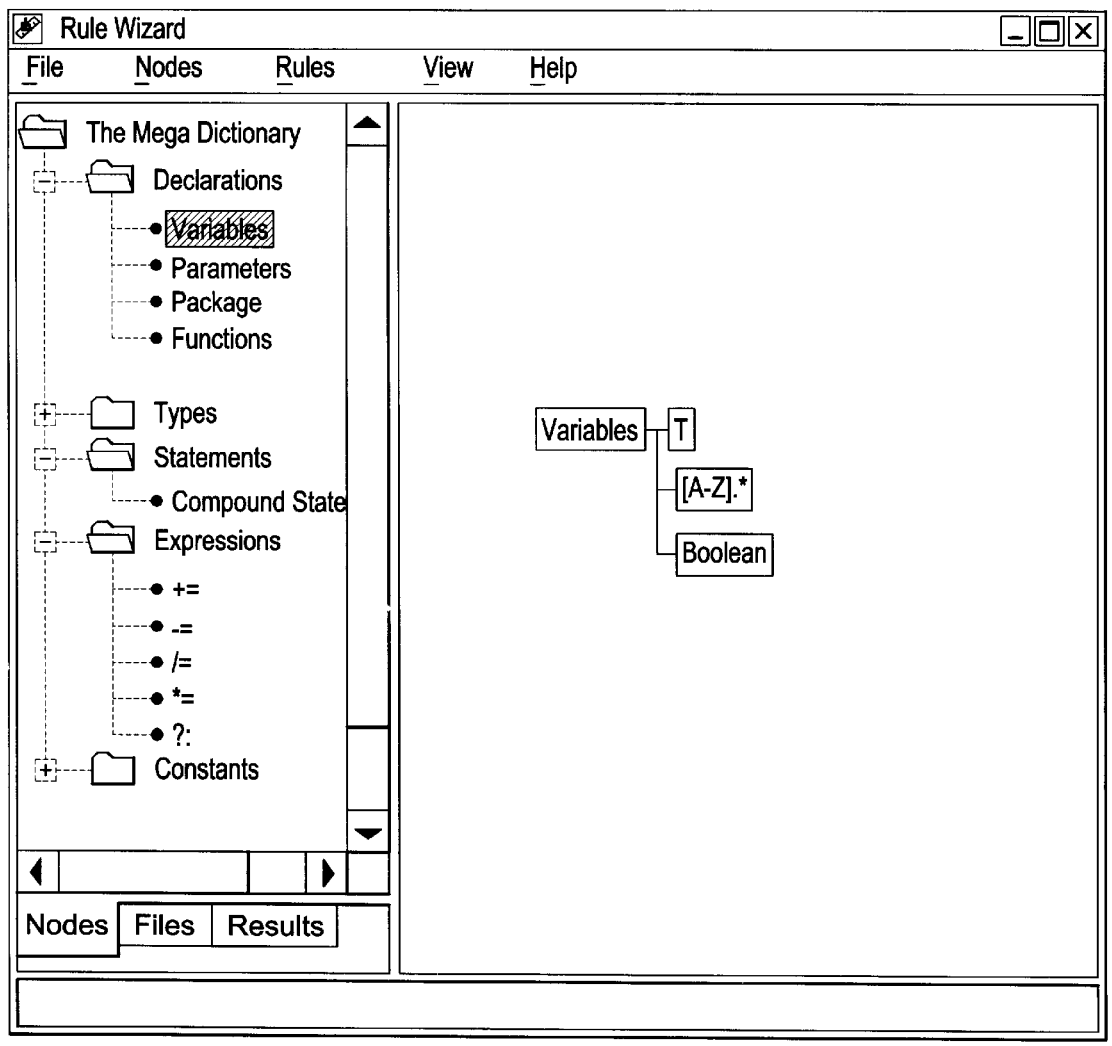
FIG. 12 is an example of a GUI for using already built rules.

Properties and Nodes do not need to represent a one-to-one correlation with the parse tree. Different kinds of new node types and properties can be developed by splitting or merging basic node types, and building extra analysis into the engine which can be used as a basic property instead of specifying the entire rule explicitly. In one embodiment, as shown in FIG. 12, the rules may be organized and grouped under different categories, such as different programming languages or different applications within a folder, for example, a Mega Dictionary that describes the relationships between nodes and properties and is platform independent. The already built rules can be copied to or dragged and dropped in graphic pane 64 to be used to create new composite rules. Rules can be combined in many different ways. For example, one rule might not check an entire parse tree, but would instead check only the nodes that match a different rule's base node, or any of its collectors. Also, Rules can refer back to properties of some nodes higher up in the search tree. For example, a level 3 rule node might want to say "match if my name is the same as the level 1 node which started matching.

Figure 13:
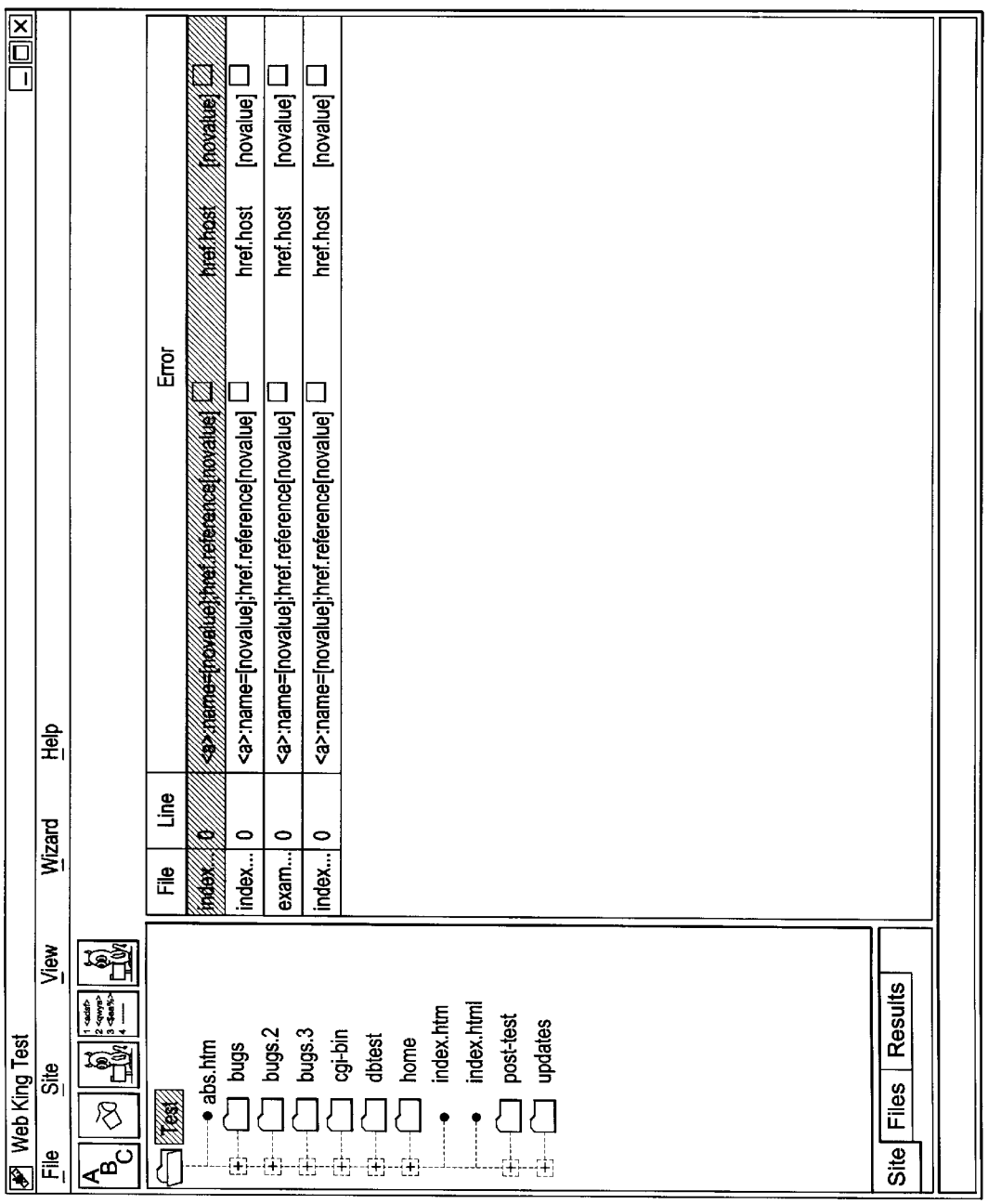
FIG. 13 is an example of a GUI for displaying results of a quality analyzer using the rules.
Figure 14:
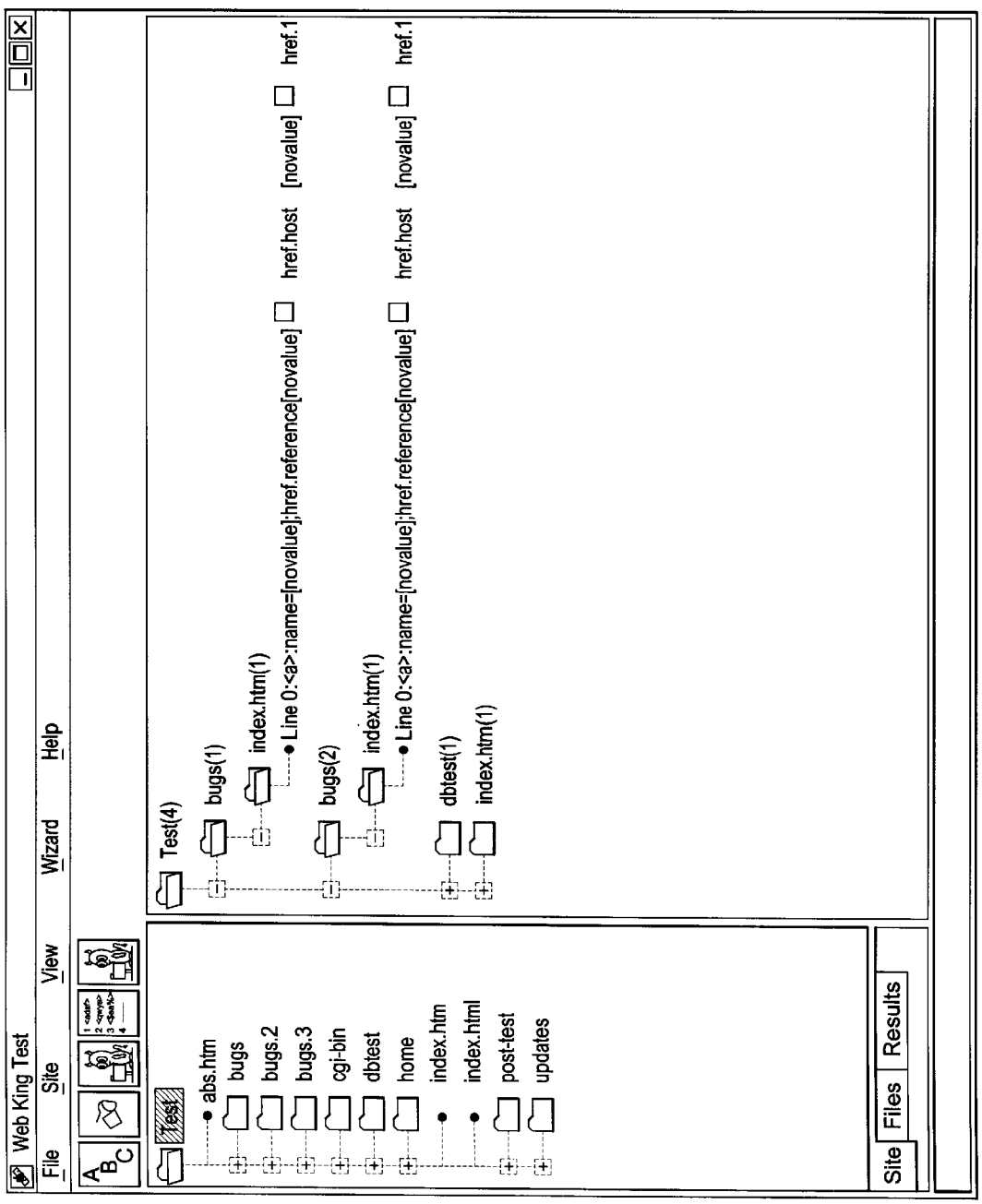
FIG. 14 is another example of a GUI for displaying results of a quality analyzer using the rules.

The results of analysis or error messages can be selectively displayed as shown in FIGS. 13 and 14. In FIG. 13, the results are displayed as a list of horizontal items with file name, line number, and the error message as titles. FIG. 14 shows the results displayed as a series of nodes hierarchically arranged.

Another example of checking for quality of a programming language is depicted in FIGS. 15A–15G and 16A–16G. These figures demonstrate steps for composing and automatically enforcing another rule, for example, a rule that flags instances where function names do not begin with a capital letter. Referring back to FIG. 7B, the nodes are displayed on the index pane 62 of the GUI 19. The graphic pane 64 is the work space for composing rules. Before a user begins creating rules, the user can enable the detailed rule view so that the rule nodes contain the greatest amount of detail. To enable the detailed site view, File>Customize Preferences is chosen, then the Detailed Rule View check box in the panel that appears is checked.

Figure 15A:
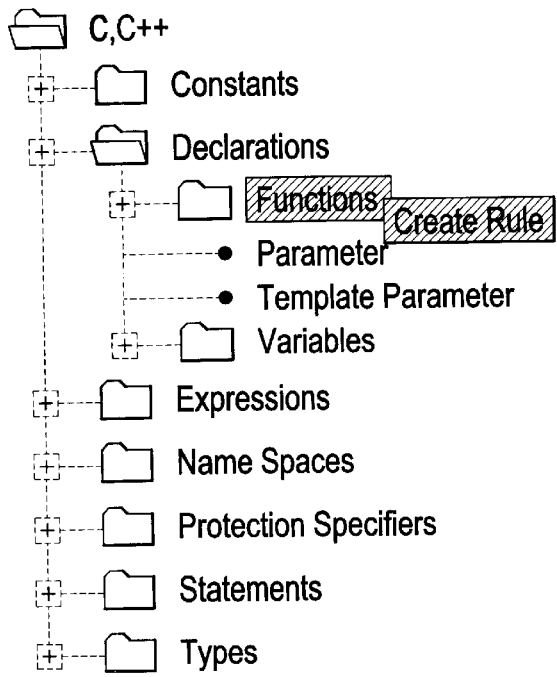
Figure 15B:
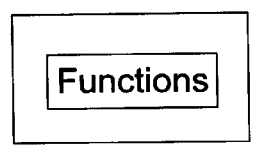
Figure 15C:
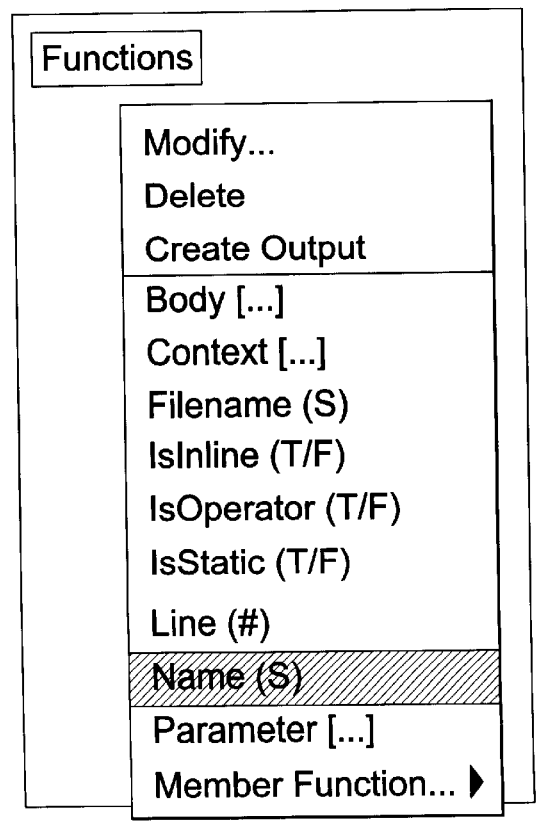

To compose the exemplary rule, the user opens Declarations, right mouse clicks on the Functions folder, then chooses Create Rule from the pop-up menu, as shown in FIG. 15A. After Create Rule is chosen, the parent rule node of FIG. 15B is displayed in the graphic pane 64 of the GUI 19. As the result of this operation, the basic building block for a rule about Function Declarations is now in place. Further qualifications to the parent rule node can now be made. To specify that this rule will be about naming conventions, the user right-clicks the Functions rule node and chooses Name from the pop-up menu that appears, as shown in FIG. 15C. A rule node that says Name: -none-attached to the parent rule node, as shown in FIG. 15D, is now displayed in the graphic pane 64.

To continue developing the rule, the user clicks on the displayed node and selects Modify from the pop-up menu, as shown in FIG. 15E. Accordingly, the Modify String window of FIG. 15F is now displayed. In the Regexp field of the Modify String Window of FIG. 15F, the user specifies what value the quality analyzer 16 should look for. If the user wants the quality analyzer to report an error if a certain value is not present in the code, (as shown in this example), the user enters the value that he/she wants to require the presence of, then checks the Negate check box. This tells the quality analyzer to report an error if the specified value is not present.

If the user wants the quality analyzer to report an error if a certain value is present in the code, the user enters the value that he/she does not want to appear in the code, then leaves the Negate check box empty. This tells the quality analyzer to report an error if the specified value is present. In this example, the Name value is to begin with a capital letter. Thus, ^[A–Z] is entered in the Modify String Window, and the Negate check box is checked, as shown in FIG. 15G. Next OK in FIG. 15G is selected. Optional Additions to the rule may be performed by the user. For example, if the user wants to exempt operator functions from this rule, the user performs the following steps, as shown in FIG. 15H:
1. Right-clicks the Function rule node,
2. Chooses IsOperator from the pop-up menu,
3. Right-clicks the IsOperator rule node, and
4. Chooses Toggle from the pop-up menu.

If the user wants to exempt constructor functions from this rule, the user performs the following steps, as shown in FIG. 15H:
1. Right-clicks the Function rule node,
2. Chooses Member Function>IsConstructor from the pop-up menu,
3. Right-clicks the IsConstructor rule node, and
4. Chooses Toggle from the pop-up menu.

If the wants to exempt destructor functions from this rule, the user performs the following steps, as shown in FIG. 15H:
1. Right-clicks the Function rule node,
2. Chooses Member Function>IsDestructor from the pop-up menu,
3. Right-clicks the IsDestructor rule node, and
4. Chooses Toggle from the pop-up menu.

When the user enters these conditions, the quality analyzer will not check whether or not the names of operator functions, constructor functions, or destructor functions begin with a capital letter.

Finally, the user needs to specify what error message(s) quality analyzer 16 should display when the created rule is violated. The first step in creating an error message is right-clicking the parent rule node (here, the Functions rule node), then choosing Create Output from the pop-up menu, as shown in FIG. 16A. In one embodiment of the present invention, an arrow symbol is then displayed next to the rule, as shown in FIG. 16B. As is, this created rule tells the quality analyzer to report an error if it finds this pattern (a function whose name does not begin with a capital letter) in the code. To tell the quality analyzer what to report when this rule is violated, the user needs to modify the output. To reach the window where output and classification can be modified, the user right clicks the empty output arrow, then chooses Modify from the pop-up menu that appears, as shown in FIG. 16C.

This action invokes the Customize Output window of FIG. 16D. In the Customize Output window, the user enters the message to be displayed by the quality analyzer when this rule is violated and then selects OK. As a result of this operation, a solid arrow is graphically displayed next to the rule, as shown in FIG. 16E. The rule now tells the quality analyzer to report the specified error message when a function's name does not begin with a capital letter. The created rule is now complete and may be saved so that the quality analyzer will be able to enforce it.

Figure 16F:
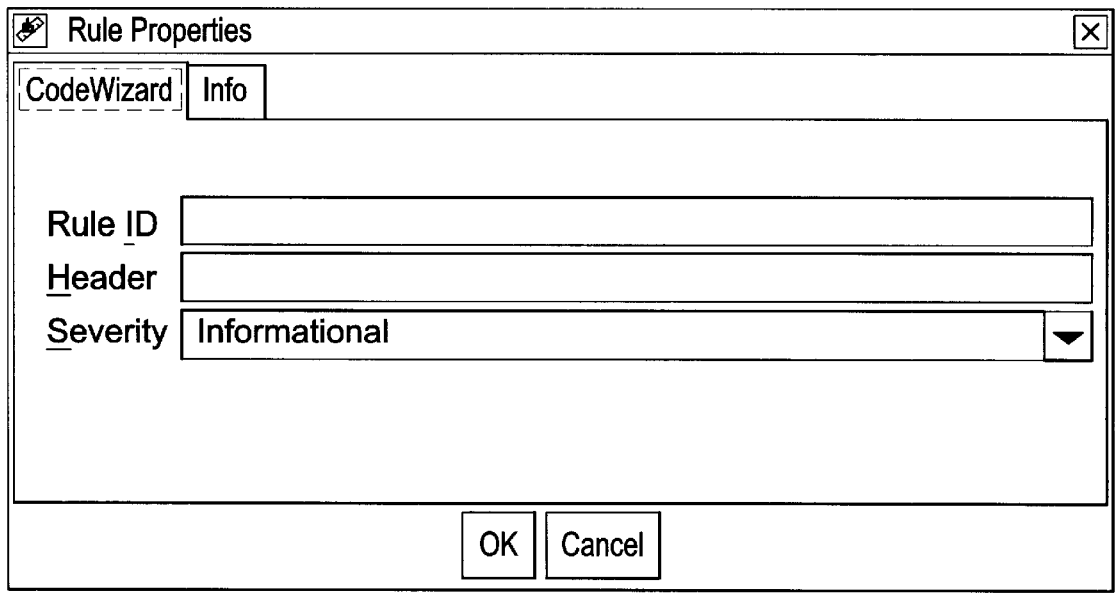

Rule properties can be customized via the Rule Properties panel of FIG. 16F. To access this panel, the user needs to choose Rule>Properties from GUI 19 of FIG. 7A or 7B. In the Rule Properties panel, the user determines the rule's properties. In the CodeWizard tab, the user types the Rule ID (the number to be assigned to the quality analyzer for this rule), the header (the name to be assigned to the quality analyzer for this rule), then chooses the rule's severity (the severity category in which the quality analyzer will classify the rule). This rule may be categorized as Informational (the default category), as shown in FIG. 16F.

Figure 16G:
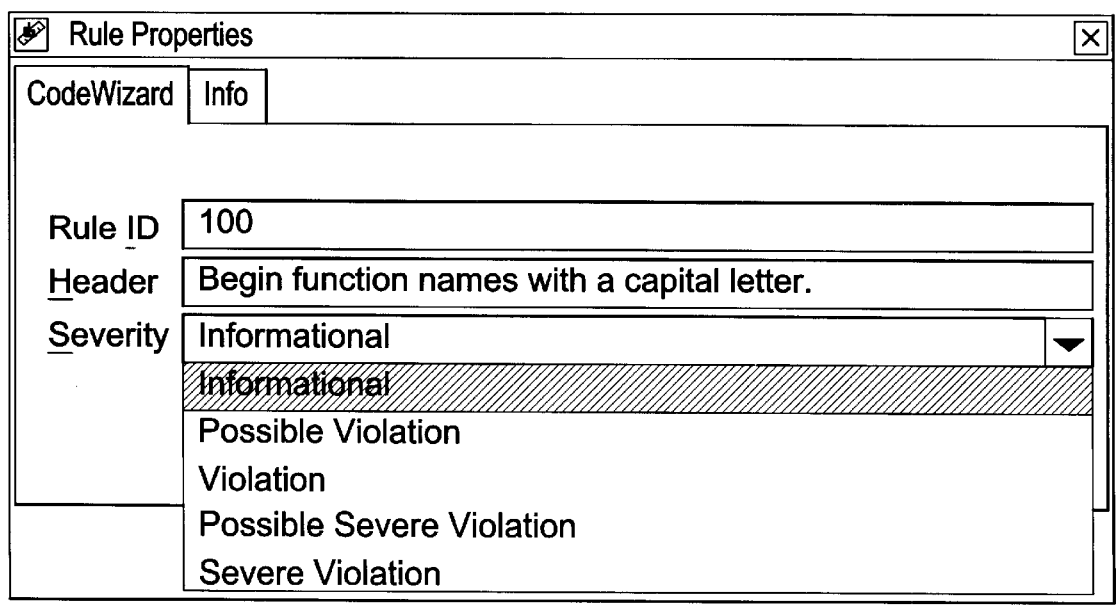

The user then clicks the Info tab, and enters name of the rule's author and a description of the rule (for example, "C++ Style Sheet"), as shown in FIG. 16G. When the user has entered all of these values, the user selects OK to close this panel. Before the user begins composing another rule, or before the user exits the program, the user may want to save the created rule so that it can be loaded into the quality analyzer. To save the rule, the user chooses Rule>Save or Rule>Save As command in the Rule panel 68C of FIG. 7A or 7B. This command invokes a file browser in which the can specify the rule's filename and path. The rule can now be enforced by quality analyzer 16.

Figure 17:
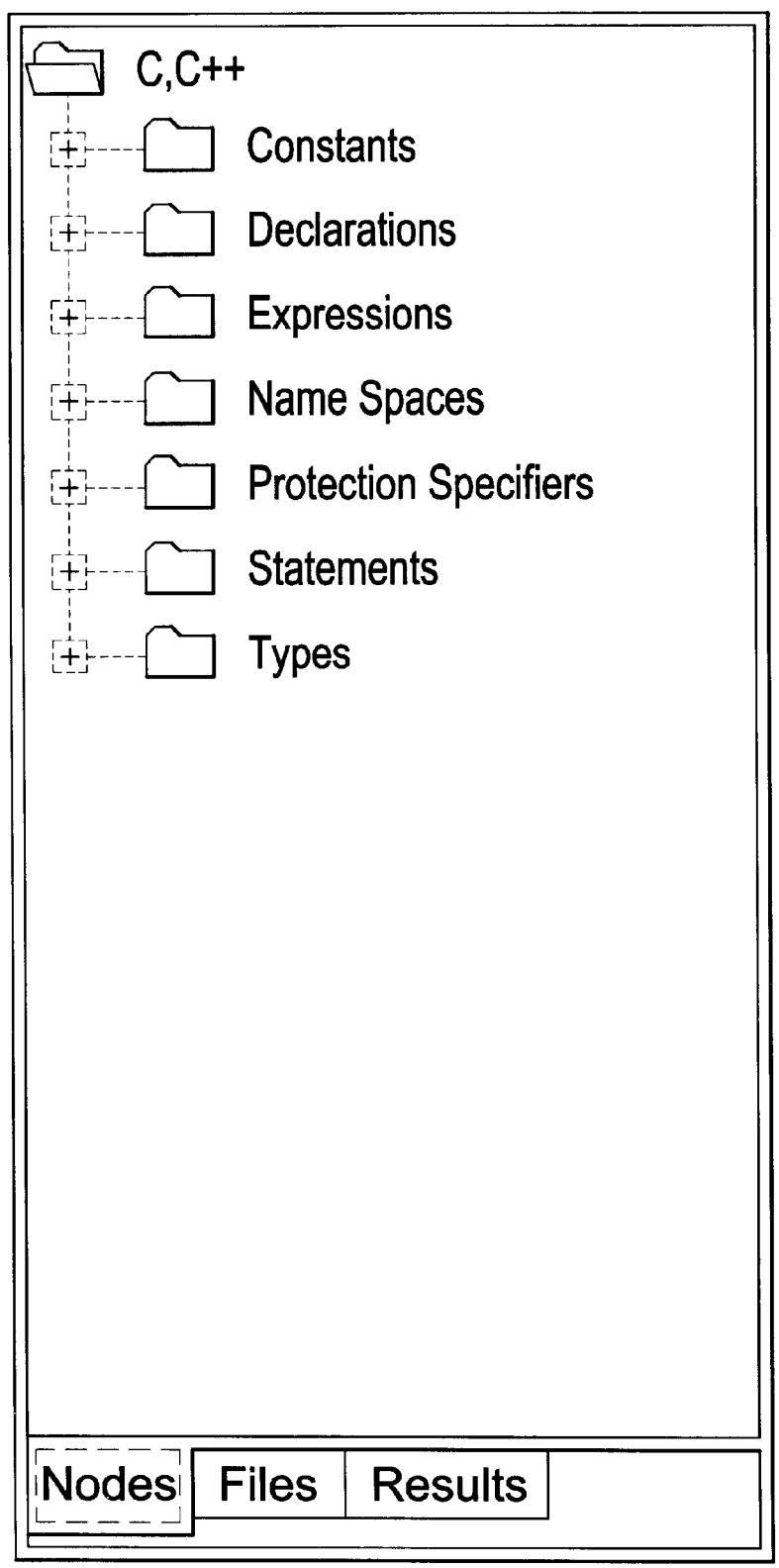
FIG. 17 is an example of a Nodes tab screen.
Figure 18:
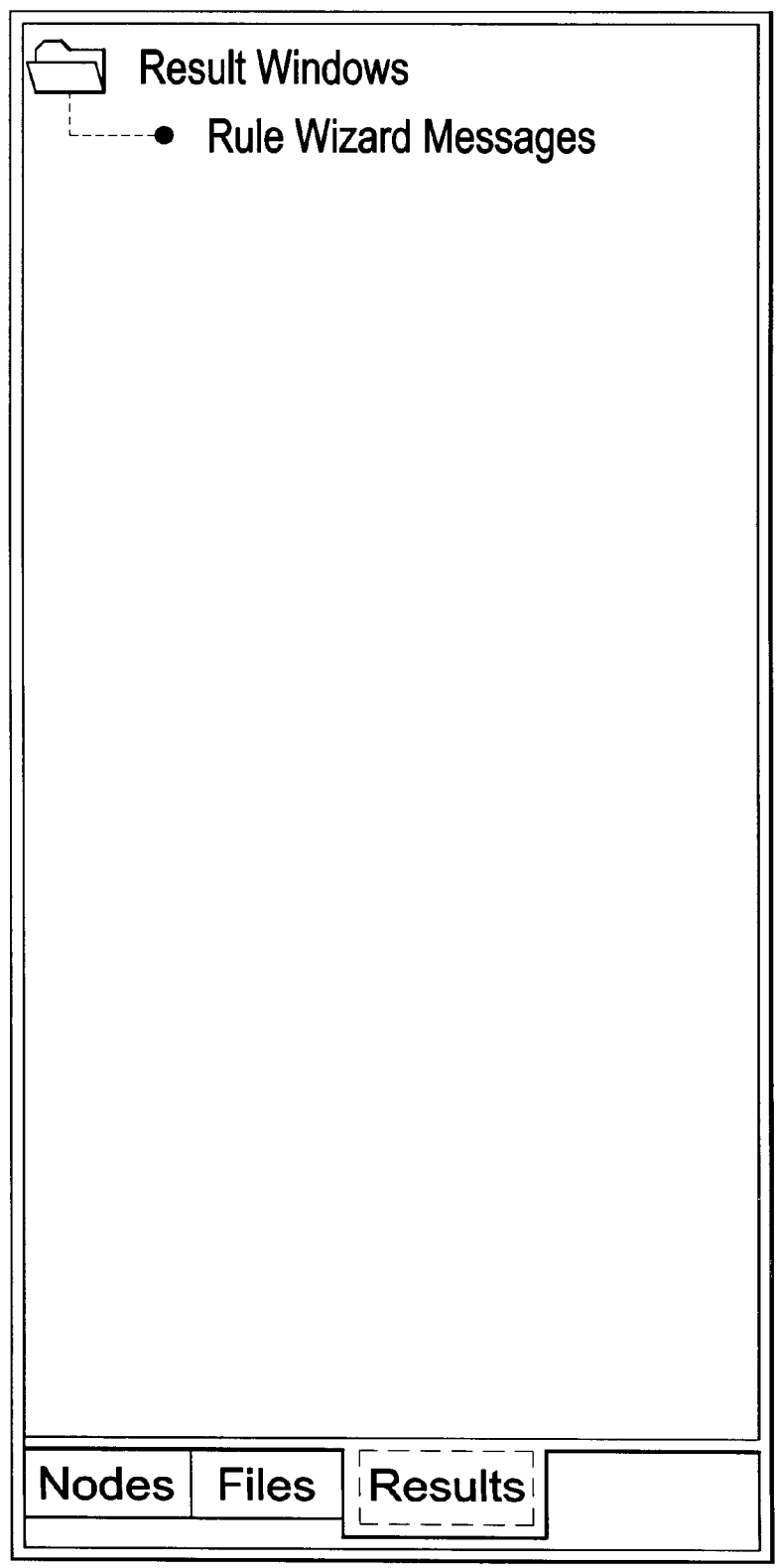
FIG. 18 is an example of a Results tab screen.

There are also a variety of GUI screens, called panels, that allow the user to specify a variety of properties for the rules. As shown in FIG. 17, the Node Tab includes the main elements of the selected programing language, in this case, C and C++ code. The user can use the Nodes tab 72 at the bottom of the index pane 62 of the GUI 19 in FIG. 7A or 7B to start creating rules. Referring to FIG. 18, selecting the Results tab opens the results tree, which displays all messages that the tool has generated. To view the results tree, the user clicks the Results tab 74 at the bottom of the index pane 62 of the GUI 19 in FIG. 7A or 7B. To view the Messages, the user clicks on that category; all results are then displayed in the graphic pane 64 of the GUI in FIG. 7A or 7B. Selecting the RuleWizard Messages results category allows the user to access all messages that have appeared on the status bar. This feature provides the user with a convenient way to go back and review a message that is no longer visible. To clear the RuleWizard Results, the user right-clicks that category and then clicks Clear in the shortcut menu.

Figure 19:
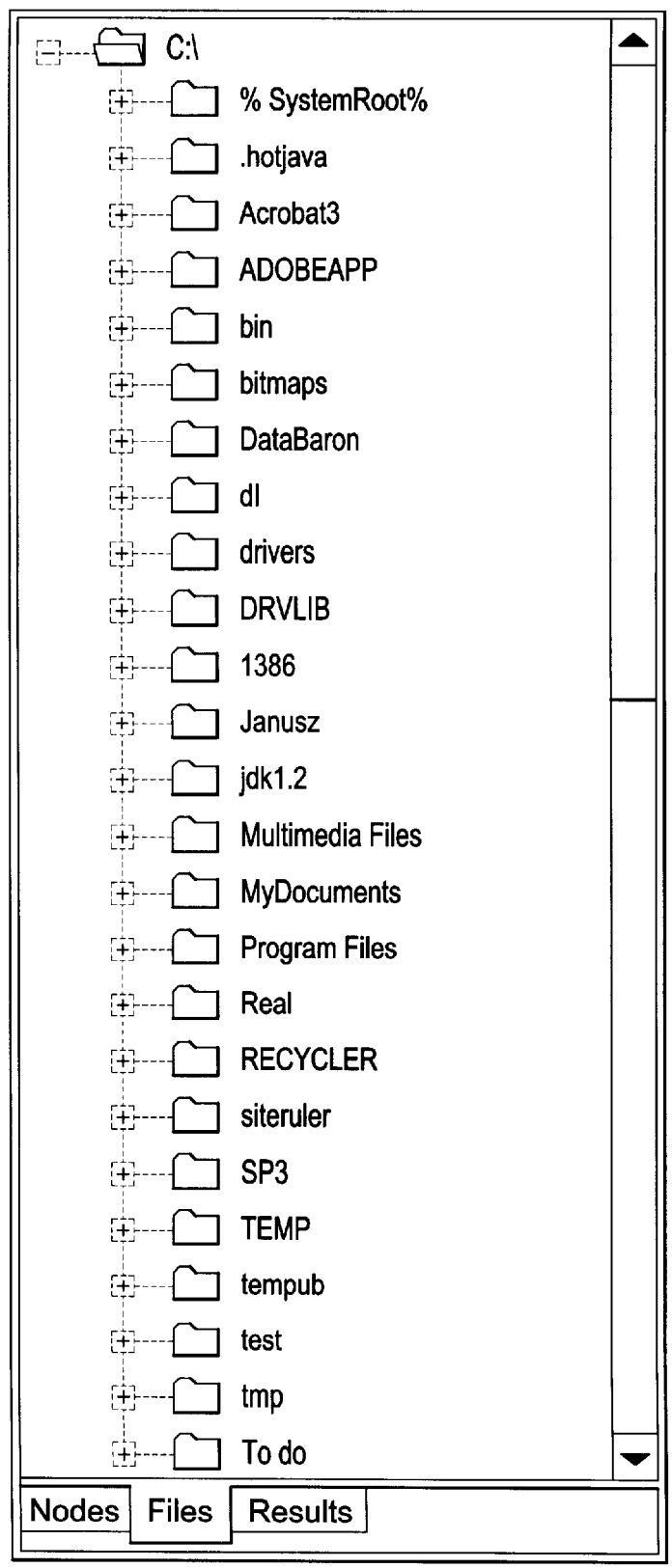
FIG. 19 is an example of a Files tab screen.
Figure 20A:
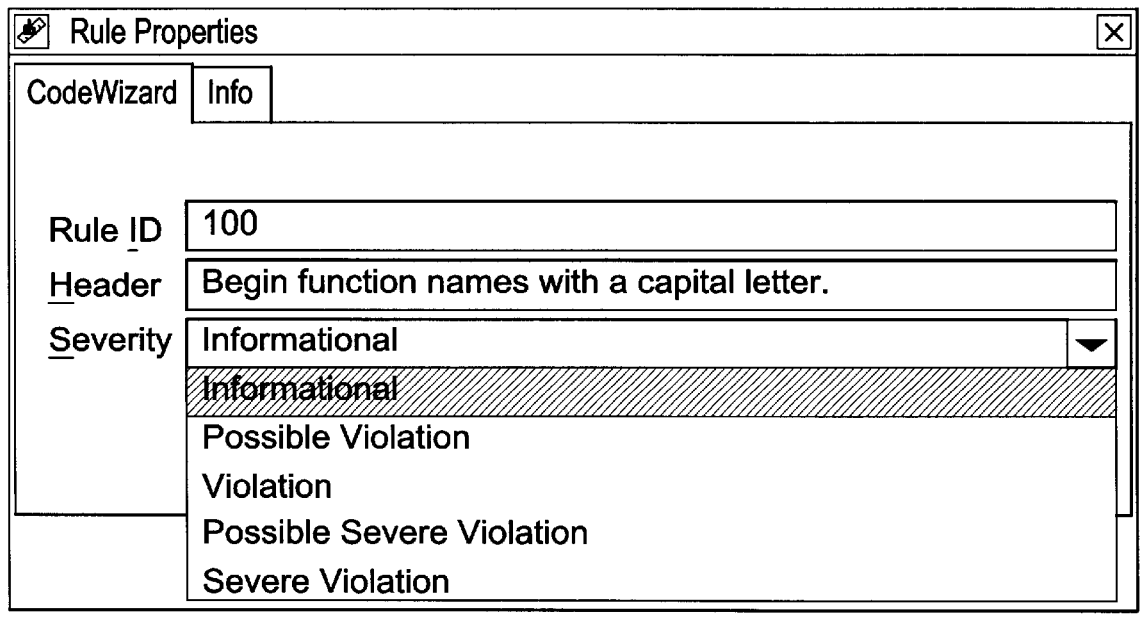
FIG. 20A is an example of a CodeWizard tab screen.
Figure 20B:
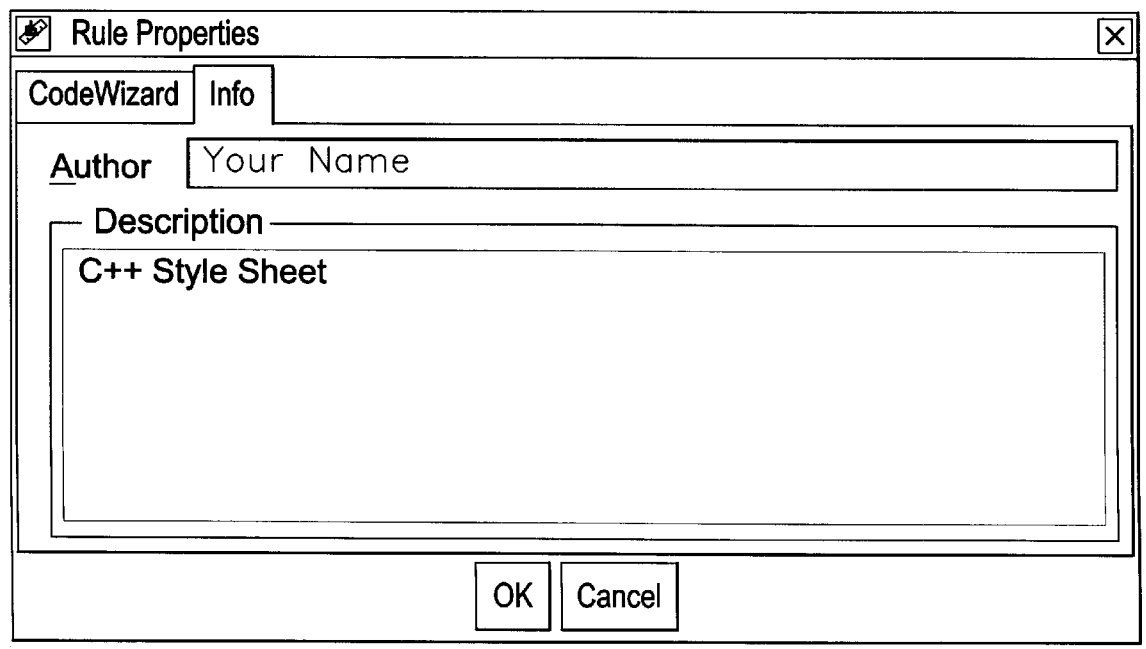
FIG. 20B is an example of an Info tab screen.

As depicted in FIG. 19, the Files tab displays the structure of the directories. Selecting the Files tab 73 in the index pane 62 of the GUI 19 in FIG. 7A or 7B displays the file tree. Referring now to FIGS. 20A and 20B, the Rule Properties panel allows the user to specify rule properties such as, Rule ID, Header, Severity, and Author Description. To open the Rule Properties panel, the user selects Rule>Properties (68C in FIG. 7A or 7B). In one embodiment, the Rule Properties panel has two tabs: CodeWizard tab (shown in FIG. 20A) that allows the user to specify properties that will be used within the quality analyzer, and Info tab (shown in FIG. 20B) that allows the user to store general information about the rule.

The CodeWizard tab allows the user to specify properties such as, Rule ID (each rule has a unique Rule ID), Header (the name that the quality analyzer will be referring to), and Severity (the category in which the quality analyzer classifies the rule), as illustrated in FIG. 20A. The quality analyzer classifies rules into groups based on the severity of violating each rule. In one embodiment, examples of violations categories include, Severe Violation, Possible Severe Violation, Violation, Possible Violation, and Informational. The Severe Violation category generally contains rules whose violation will definitely result in a program bug. Each category below Severe Violation preferably contains rules whose violations have a progressively lower probability of resulting in an error. The quality analyzer users can suppress rules according to their severity. If the rule's severity is not specified, it will preferably be categorized as Informational (the default setting). However, this default setting may be changed.

As shown in FIG. 20B, the Info tab allows the user to specify the properties such as, Author, Description, and the like. Furthermore, a Preferences panel (not shown) allows the user to specify options related to the level of detail displayed by each rule and the web browser to be used. To open the
Preferences panel, the user selects File>Customize>Preferences (68A in FIG. 7A or 7B).

Figure 21:
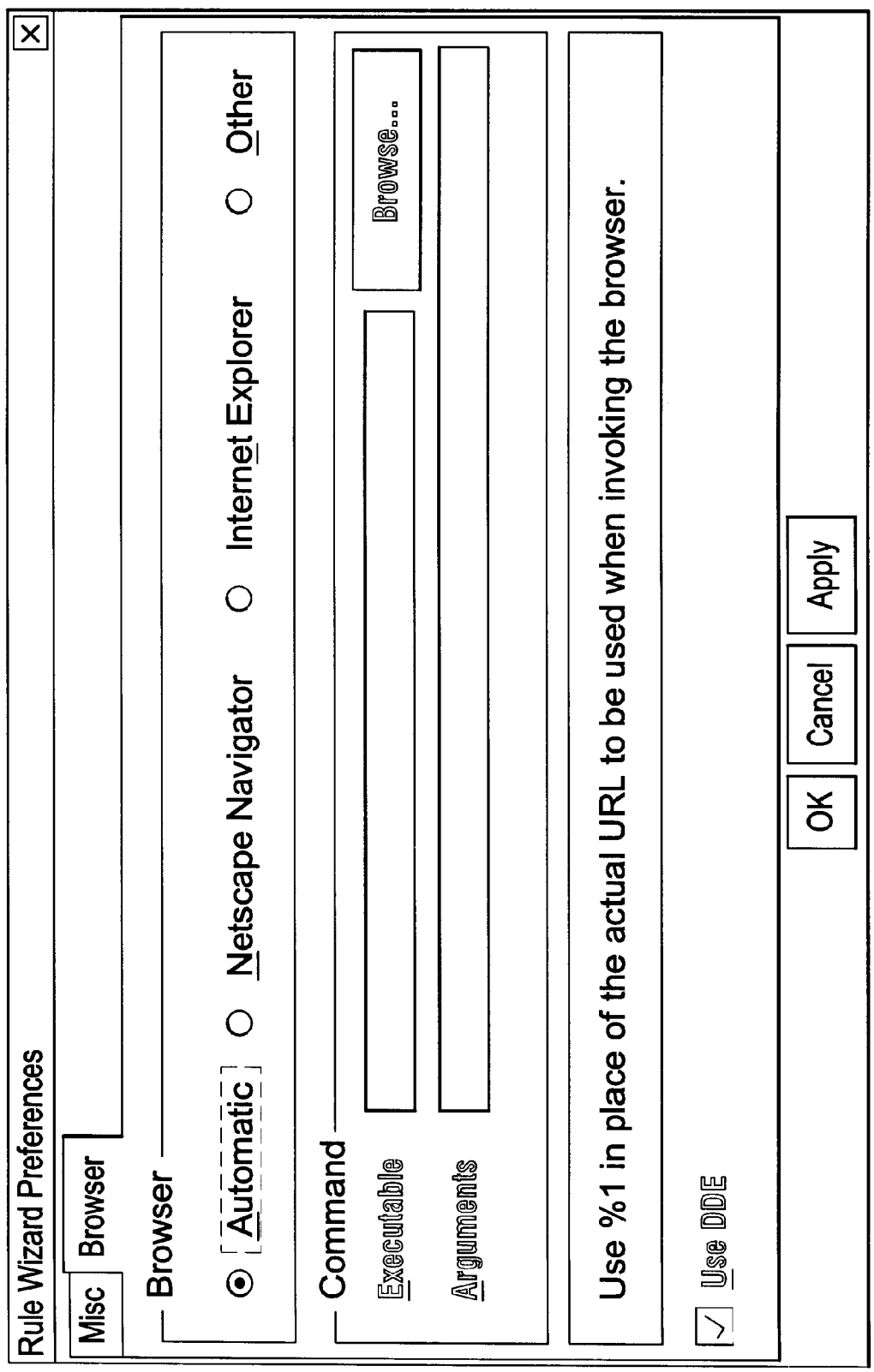
FIG. 21 is an example of a Browser tab screen.

Referring now to FIG. 21, a Browser tab allows the user to configure preferences such as: Browser, to determine what browser the tool uses; Command, to determine browser commands; Name of the executable related to the selected browser; and any arguments the user wants the tool to pass to that browser. If the user selects a browser name that is provided, the tool automatically fills in both Executable and Arguments. If the user selects Other, the user can select Browse to navigate to the appropriate Executable settings.

Use DDE is another property that may be configured by the user using the Browser tab. Use DDE preferably controls the way a user communicates with a browser and determines whether or not Dynamic Data Exchange (DDE) lets programs share information. In one embodiment, if the user selects Use DDE, the changes the user makes to files may automatically be applied to other programs that use those same files. Preferably, Use DDE is selected by default but may be disabled.

In one embodiment, the present invention is capable of searching for a specific pattern in a given data set which can be broken down into smaller nodes with a defined relationship between them. For instance, a user might want to enforce a function limit of ten per file, or might want a rule that lists the number of functions per file. As an another example, the user could create rules to verify information in a database, e.g., finding all fields which are referenced in Table A which are not defined in Table B. The user could perform this task (depending on complexity) with the Standard Query Language (SQL) or SQL-generators SQL to store, access, and modify data in the tables. However, using a consistent paradigm would feel very natural to a user familiar with the system, and the user could leverage the look and feel in many ways (all the user needs are "nodes" and properties").

As yet another example, if the user can visually dissect an image, the user could define the different elements as nodes relating to each other. A rule can be graphically generated to "use no more than 2 major colors" or "avoid contrasting colors" or "our logo should always have this specific color." All with the same rule-creating GUI, but a different engine. Furthermore, the user can make up queries specific to the current task, can create rules specific to a certain class, or merely can arrange and style information for a specific company. For instance, the user might want to write a rule to check a specific pattern which the user overuses or feel could be improved.

While various embodiments of the invention have been particularly shown, it will be understood by those skilled in the art that various changes in form and detail may be made without departing from the scope and spirit of the present invention.

What is claimed is:

1. A method using a computer for generating user-defined rules to be used for checking the quality of a computer programming language including nodes and properties, said method being responsive to user interaction in a graphical user interface (GUI) comprising the steps of:
   selecting a programming language for which the quality is to be checked from a first menu displayed in the GUI;
   responsive to the programming language selection, displaying a second menu in the GUI including a plurality of nodes related to the selected programming language;
   selecting a node from the plurality of nodes for building a rule for checking the quality of the selected programming language;
   displaying, in the GUI, the selected node in a form of a graphical object;
   responsive to the selected node, displaying in the GUI a third menu including a plurality of properties for the selected node and related to the selected programming language;
   selecting a property from the plurality of displayed properties;
   displaying, in the GUI, the selected property in a form of a graphical attribute connected to the selected node;
   storing the graphical object, the graphical attribute and their relation as a rule for checking the quality of the selected programming language; and
   executing the stored rule to check for violation of the stored rule by the selected programming language.

2. The method of claim 1 further comprising the steps of:
   selecting an output joint from a plurality of displayed output joints for directing output of the selected node;
   displaying, in the GUI, the selected output joint in a form of a second graphical attribute connected to the selected node;
   defining a relationship between the output joint displayed as the second graphical attribute and the selected node; and
   storing the output joint and its relation to the selected node.

3. The method of claim 2 further comprising the step of executing the stored rule to check for violation of the stored rule by the computer programming language.

4. The method of claim 3 further comprising the step of displaying a violation report.

5. The method of claim 1 wherein the plurality of nodes includes folders that include nodes of similar types.

6. The method of claim 1 wherein the selecting a programming language step comprises selecting one or more of JAVA™, HTML, C, and C++ programming languages.

7. The method of claim 1 wherein selecting the displayed graphical object displays more information about the selected graphical object.

8. The method of claim 1 wherein selecting the displayed graphical attribute displays more information about the selected graphical attribute.

9. The method of claim 1 further comprising selecting a stored rule as a building block for generating a composite rule.

10. A computer readable medium having stored instructions, the stored instructions including instructions which, when executed by a processor, cause the processor to perform the steps of:
   receiving a programming language selection for which the quality is to be checked from a first menu displayed in a graphical user interface (GUI);
   responsive to the received programming language selection, displaying a second menu including a plurality of nodes related to the selected programming language in the GUI;
   receiving a node selection for building a rule for checking the quality of the selected programming language from the plurality of nodes;
   displaying, in the GUI, the selected node in a form of a graphical object;
   responsive to the selected node, displaying in the GUI a third menu including a plurality of properties for the selected node and related to the selected programming language;
   receiving a property selection from the plurality of displayed properties displaying, in the GUI, the selected property in a form of a graphical attribute connected to the selected node; and storing the graphical object, the graphical attribute and their relation as a rule to be used to check the quality of the selected programming language; and executing the stored rule to check for violation of the stored rule by the selected programming language.

11. The computer readable medium of claim 10, further comprising instructions which, when executed by a processor, cause the processor to perform the steps of:

receiving a user selection of an output joint selected from a plurality of displayed output joints having a relationship with the selected node for directing output of the selected node;

displaying the received selection of an output joint in a form of a second graphical attribute connected to the selected node; and storing the output joint and its relation to the selected node.

12. The computer readable medium of claim 10, further comprising instructions which, when executed by a processor, cause the processor to perform the step of executing the stored rule to check for violation of the stored rule by the computer programming language.

13. A method using a computer for creating rules to be used to check the quality of a language comprising the steps of:

selecting a language for which the quality is to be checked from a first menu displayed in the GUI;

displaying, in a graphical user interface (GUI), a plurality of nodes representing relationships in the selected language;

receiving a first input from a user selecting a node from the plurality of nodes for building a rule for checking the quality of the selected language;

displaying, in the GUI, the selected node in a form of a graphical object;

responsive to the selected node, displaying a plurality of properties for the selected node and related to the selected language;

receiving a second input from the user selecting a property from the plurality of displayed properties;

displaying, in the GUI, the selected property in a form of a graphical attribute connected to the selected node;

storing the graphical object, the graphical attribute and their relation as a rule for checking the quality of the selected language; and executing the stored rule to check for violation of the stored rule by the selected language.

14. The method of claim 13 further comprising the steps of:

receiving a third input from the user selecting an output joint from a plurality of displayed output joints for directing output of the selected node;

displaying, in the GUI, the selected output joint in a form of a second graphical attribute connected to the selected node; and storing the output joint and its relation to the selected node.

15. The method of claim 14 further comprising the step of executing the stored rule to check for quality violation of the stored rule by the language.

16. The method of claim 15 further comprising the step of displaying a violation report.

17. The method of claim 13 wherein the plurality of nodes includes folders that include nodes of similar types.

18. The method of claim 13 wherein selecting the displayed graphical object displays more information about the selected graphical object.

19. The method of claim 13 wherein selecting the displayed graphical attribute displays more information about the selected graphical attribute.

20. The method of claim 13 further comprising receiving a third input from a user selecting a stored rule as a building block for generating a composite rule.

21. A computer program product for use in a computer system for generating rules to check the quality of a language, the computer program product comprising a computer usable medium having computer readable program code thereon for generating a graphical user interface (GUI) which facilitates generating the rules to check the quality of the language, the computer readable program code comprising:

program code for selecting a language for which the quality is to be checked from a first menu displayed in the GUI;

program code for displaying, in a graphical user interface (GUI), a plurality of nodes representing relationships in the selected language;

program code for receiving a first input from a user selecting a node from the plurality of nodes to build a rule for checking the quality of the selected language;

program code for displaying, in the GUI, the selected node in a form of a graphical object;

program code for responsive to the selected node, displaying a plurality of properties for the selected node and related to the selected language;

program code for receiving a second input from the user selecting a property from the plurality of displayed properties;

program code for displaying, in the GUI, the selected property in a form of a graphical attribute connected to the selected node;

program code for storing the graphical object, the graphical attribute and their relation as a rule to check the quality of the selected language; and program code for executing the stored rule to check for violation of the stored rule by the selected language.

* * * * *